(12) United States Patent
Tooher et al.

(10) Patent No.: US 12,150,138 B2
(45) Date of Patent: Nov. 19, 2024

(54) RECEIVING CONTROL INFORMATION IN NR-U

(71) Applicant: InterDigital Patent Holdings, Inc., Wilmington, DE (US)

(72) Inventors: J. Patrick Tooher, Montreal (CA); Shahrokh Nayeb Nazar, San Diego, CA (US); Aata El Hamss, Laval (CA); Afshin Haghighat, Ile-Bizard (CA); Oghenekome Oteri, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 335 days.

(21) Appl. No.: 17/429,673

(22) PCT Filed: Feb. 10, 2020

(86) PCT No.: PCT/US2020/017443
§ 371 (c)(1),
(2) Date: Aug. 10, 2021

(87) PCT Pub. No.: WO2020/167634
PCT Pub. Date: Aug. 20, 2020

(65) Prior Publication Data
US 2022/0141805 A1    May 5, 2022

Related U.S. Application Data

(60) Provisional application No. 62/804,993, filed on Feb. 13, 2019, provisional application No. 62/829,169, (Continued)

(51) Int. Cl.
*H04W 72/0446* (2023.01)
*H04W 72/23* (2023.01)
*H04W 74/0808* (2024.01)

(52) U.S. Cl.
CPC ....... *H04W 72/23* (2023.01); *H04W 72/0446* (2013.01); *H04W 74/0808* (2013.01)

(58) Field of Classification Search
None
See application file for complete search history.

(56) References Cited

U.S. PATENT DOCUMENTS

| 11,394,447 B2 | 7/2022 | Deenoo et al. |
| 2018/0220459 A1 | 8/2018 | Park et al. |

(Continued)

FOREIGN PATENT DOCUMENTS

| CN | 108702180 A | 10/2018 |
| EP | 2632205 B1 | 8/2018 |

(Continued)

OTHER PUBLICATIONS

3rd Generation Partnership Project (3GPP), TR 38.889 V16.0.0, "Technical Specification Group Radio Access Network, Study on NR-Based Access to Unlicensed Spectrum (Release 16)", Dec. 2018, pp. 1-119.

(Continued)

*Primary Examiner* — The Hy Nguyen
(74) *Attorney, Agent, or Firm* — Condo Roccia Koptiw LLP

(57) ABSTRACT

A WTRU may receive a plurality of monitoring configurations. The plurality of monitoring configurations may be associated with a plurality of sub-bands. The WTRU may apply a monitoring configuration based on the location of a slot inside or outside of a COT. For example, the WTRU may apply (e.g., use) a first monitoring configuration outside a COT. The WTRU may apply a second monitoring configuration in a first slot of a COT. The WTRU may apply a third monitoring configuration to the slots of a COT subsequent to the first slot of the COT. The WTRU may switch back to the first monitoring configuration on a condition that the COT ends.

11 Claims, 8 Drawing Sheets

Related U.S. Application Data filed on Apr. 4, 2019, provisional application No. 62/840,593, filed on Apr. 30, 2019, provisional application No. 62/930,768, filed on Nov. 5, 2019.

(56) References Cited

U.S. PATENT DOCUMENTS

| | | | |
|---|---|---|---|
| 2018/0359807 | A1 | 12/2018 | Kim et al. |
| 2019/0208482 | A1 | 7/2019 | Patrick et al. |
| 2020/0145972 | A1* | 5/2020 | Kwak .................. H04W 72/23 |
| 2020/0367253 | A1* | 11/2020 | Kim ...................... H04W 80/08 |
| 2020/0404586 | A1* | 12/2020 | Zhang ............... H04W 52/0216 |
| 2021/0092622 | A1* | 3/2021 | Tiirola .............. H04W 72/0453 |
| 2021/0258931 | A1* | 8/2021 | Kim .................... H04B 7/0695 |
| 2022/0110118 | A1* | 4/2022 | Wu .................. H04W 74/0808 |
| 2022/0225412 | A1* | 7/2022 | Tooher .............. H04W 72/0453 |
| 2022/0256603 | A1* | 8/2022 | Harada ................ H04L 5/0053 |

FOREIGN PATENT DOCUMENTS

| | | |
|---|---|---|
| EP | 3606243 A1 | 2/2020 |
| TW | 201813340 A | 4/2018 |
| WO | 2021019740 A1 | 2/2021 |

OTHER PUBLICATIONS

3rd Generation Partnership Project (3GPP), R1-1900348, "On DL Signals and Channels", Nokia, Nokia Shanghai Bell, 3GPP TSG RAN WG1 Meeting AH-1901, Taipei, Taiwan, Jan. 21-25, 2019, 14 pages.

3rd Generation Partnership Project (3GPP), R1-1900871, "DL Signals and Channels for NR-U", Qualcomm Incorporated, 3GPP TSG RAN WG1 Meeting AH-1901, Taipei, Taiwan, Jan. 21-25, 2019, 9 pages.

3rd Generation Partnership Project (3GPP), R1-1900996, "DL Signals and Channels for NR-U", Ericsson, 3GPP TSG-RAN WG1 Meeting Ad Hoc 1901, Taipei, Taiwan, Jan. 21-25, 2019, 8 pages.

3rd Generation Partnership Project (3GPP), RP-182898, "New WID on 410-430 MHz E-UTRA FDD Band(s) for LTE PPDR and PMR/PAMR in Europe", Nokia, 3GPP TSG RAN Meeting #82, Sorrento, Italy, Dec. 10-13, 2018, 5 pages.

3rd Generation Partnership Project (3GPP), TS 38.213 V15.3.0, "Technical Specification Group Radio Access Network, NR, Physical Layer Procedures for Control (Release 15)", Sep. 2018, pp. 1-101.

3rd Generation Partnership Project (3GPP), R1-1900468, "DL Signals and Channels for NR-unlicensed", Intel Corporation, 3GPP TSG RAN WG1, Meeting #AH-1901, Taipei, Taiwan, Jan. 21-25, 2019, 5 pages.

* cited by examiner

RECEIVING CONTROL INFORMATION IN NR-U

CROSS-REFERENCE TO RELATED CASES

This application is the National Stage Entry under 35 U.S.C. § 371 of Patent Cooperation Treaty Application No. PCT/US2020/017443, filed Feb. 10, 2020, which claims the benefit of U.S. Provisional Patent Application No. 62/804,993, filed Feb. 13, 2019, U.S. Provisional Patent Application No. 62/829,169, filed Apr. 4, 2019, U.S. Provisional Patent Application No. 62/840,593, filed Apr. 30, 2019, and U.S. Provisional Patent Application No. 62/930,768, filed Nov. 5, 2019, the contents of which are incorporated by reference it its entirety.

BACKGROUND

Mobile communications are in continuous evolution and are already at the doorstep of their fifth incarnation—5G.

SUMMARY

Systems, methods, and instrumentalities associated with receiving control information in new radio (NR) wireless transmit/receive units (WTRUs) may be provided. A WTRU may receive a plurality of monitoring configurations. The plurality of monitoring configurations may be associated with a plurality of sub-bands. The WTRU may apply (e.g., outside of a channel occupancy time (COT)) a first monitoring configuration of the plurality of monitoring configurations to the plurality of sub-bands. The first monitoring configuration may include being configured to monitor search spaces of each of the plurality of sub-bands (e.g., using a first periodicity). The WTRU may receive a COT indication associated with a first sub-band of the plurality of sub-bands. The COT indication may indicate a start of the COT. The COT indication may indicate a duration of the COT. The WTRU may apply (e.g., during the COT) a second monitoring configuration of the plurality of monitoring configurations to the first sub-band of the plurality of sub-bands. The second monitoring configuration may include being configured to monitor search spaces in each slot of the COT associated with the second monitoring configuration (e.g., using a second periodicity). The WTRU may apply a third monitoring configuration of the plurality of monitoring configurations to the first sub-band between the received COT indication and a first slot boundary in the COT. The WTRU may switch from the second monitoring configuration to the first monitoring configuration at an end of the COT.

DETAILED DESCRIPTION

Figure 1A:
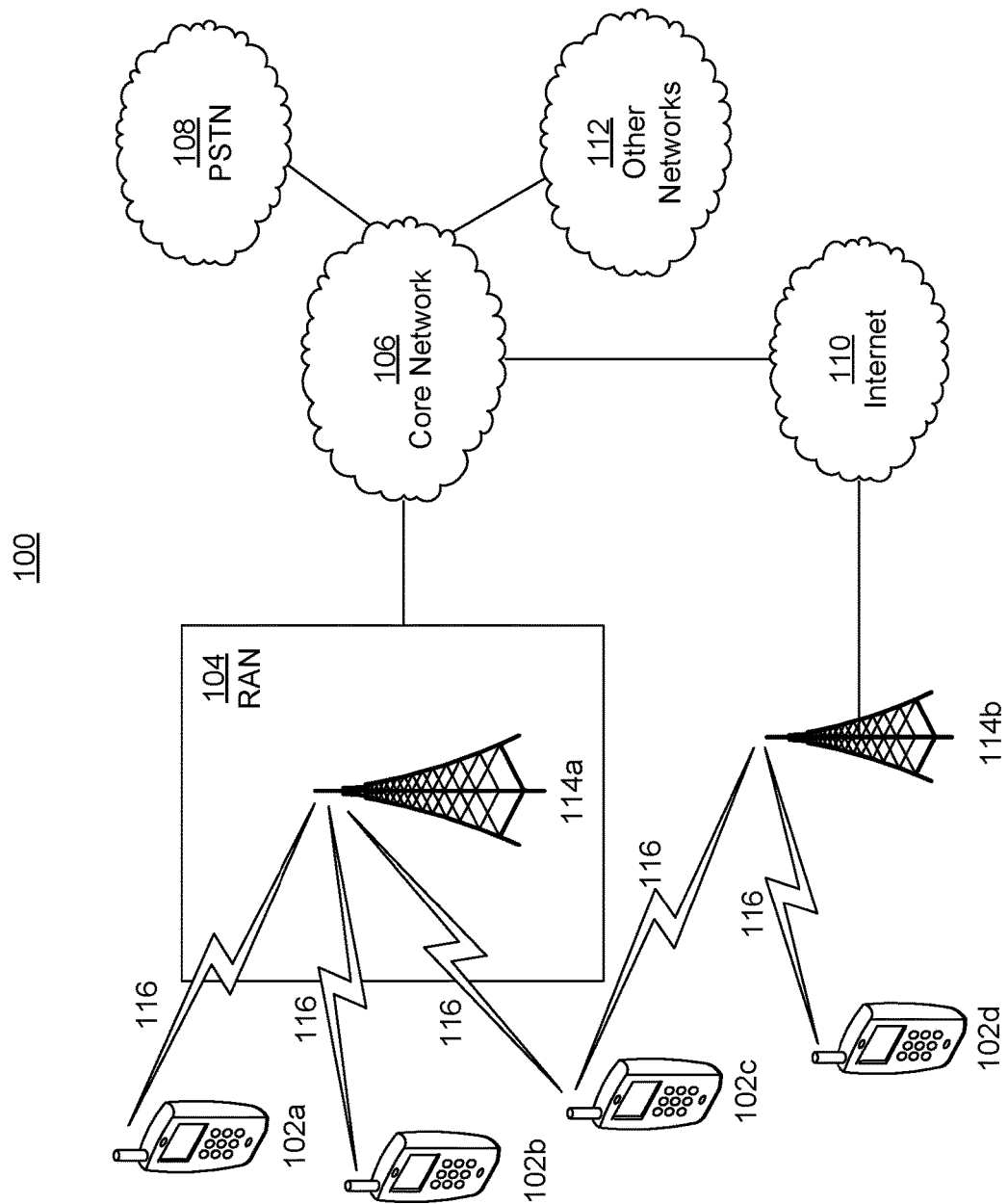
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers.

For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
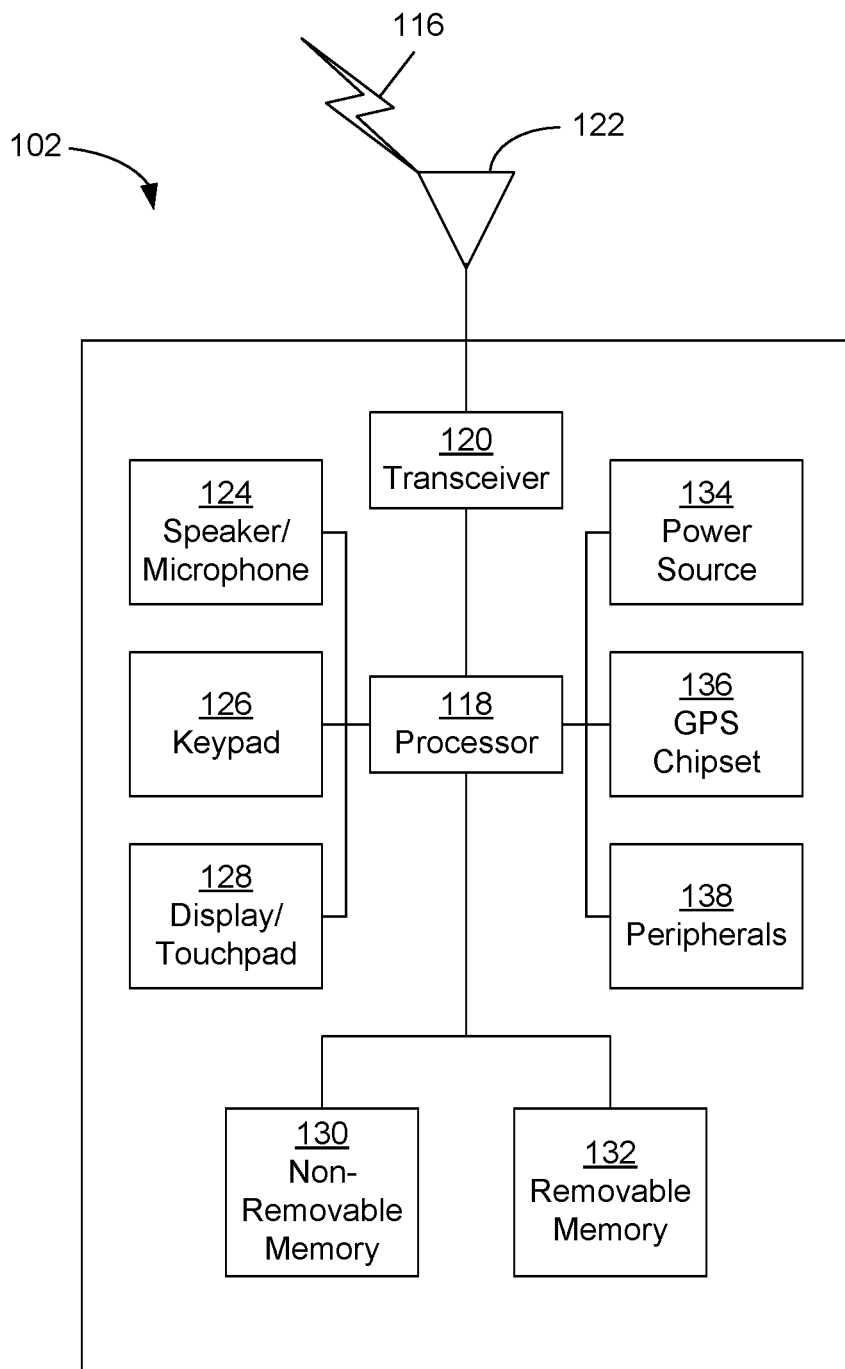
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
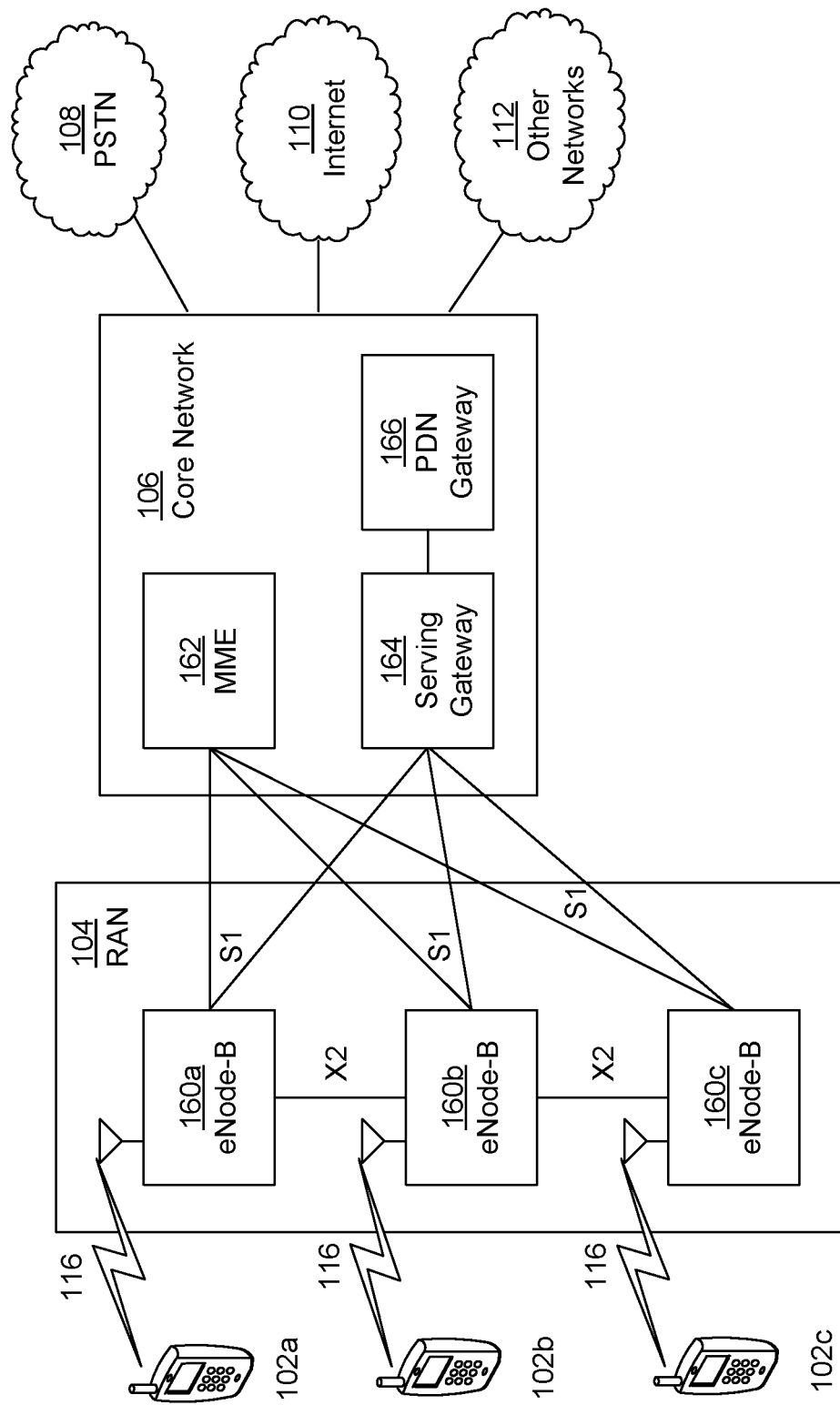
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
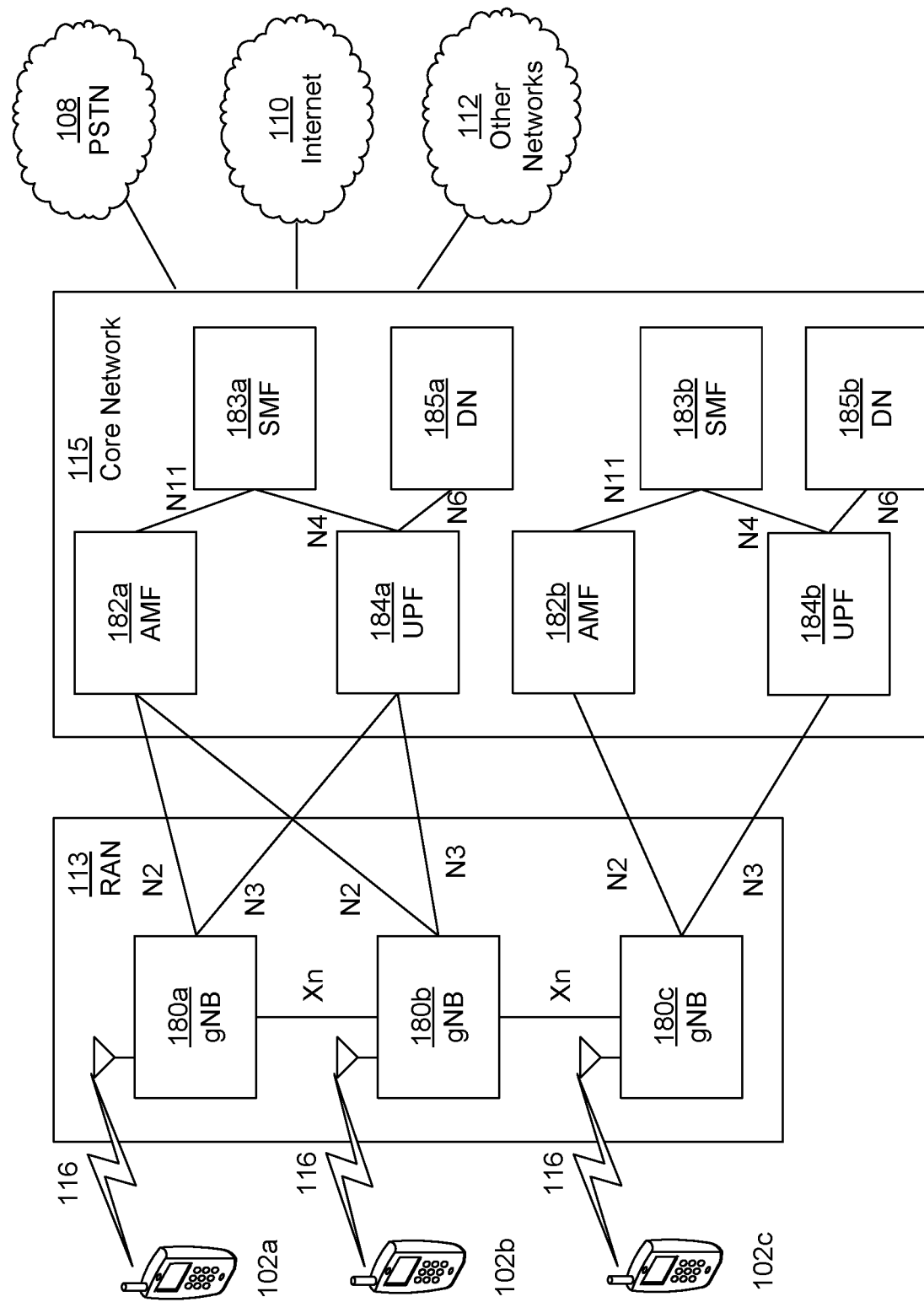
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Unlicensed operation may be performed. Operation in an unlicensed frequency band may be subject to some limits on one or more of transmit power control (TPC), RF output power, or power density (e.g., given by the mean EIRP and the mean EIRP density at the highest power level). Operation in an unlicensed frequency band may be subject to requirements on a transmitter of out of band emissions. The requirements may be specific to bands and/or geographical locations.

Operation may be subject to requirements on the Nominal Channel Bandwidth (NCB). Occupied Channel Bandwidth (OCB) may be defined for unlicensed spectrum in the 5 GHz region. The NCB may be at least 5 MHz. The NCB may include the widest band of frequencies inclusive of guard bands assigned to a single channel. The OCB (e.g., the bandwidth containing 99% of the power of the signal) may be between 80% and 100% of a declared NCB. For example, during an established communication, a device may be allowed to operate temporarily in a mode where the device's OCB may be reduced to as low as 40% of the device's NCB with a minimum of 4 MHz.

Channel access in an unlicensed frequency band may use a Listen-Before-Talk (LBT) mechanism. LBT may be used independently of whether the channel is occupied or not.

For frame-based systems, LBT may be characterized by a Clear Channel Assessment (CCA) time (e.g., ~20 μs), a Channel Occupancy time (e.g., minimum 1 ms, maximum 10 ms), an idle period (e.g., minimum 5% of channel occupancy time), a fixed frame period (e.g., relatively equal to the channel occupancy time+idle period), a short control signaling transmission time (e.g., maximum duty cycle of 5% within an observation period of 50 ms), and/or a CM energy detection threshold.

For load-based systems (e.g., transmit/receive structure may not be fixed in time), LBT may be characterized by a number N (e.g., corresponding to the number of clear idle slots in extended CCA) instead of the fixed frame period. N may be selected randomly within a range.

Deployment scenarios may include different standalone NR-based operations, different variants of dual connectivity operations, and/or different variants of carrier aggregation (CA) (e.g., possibly including different combinations of zero or more carriers of each of LTE and NR RATs). Dual connectivity operations may include EN-DC with at least one carrier operating according to the LTE radio access technology (RAT) or NR DC with at least two sets of one or more carriers operating according to the NR RAT.

For example, one or more of the following functionalities may be considered for an LAA system.

Listen-before-talk (e.g., clear channel assessment) may be provided in an LAA system.

The LBT may include a mechanism by which an equipment applies a clear channel assessment (CCA) check before using the channel. The CCA may utilize at least energy detection to determine a presence or absence of other signals on a channel, e.g., to determine if a channel is occupied or clear, respectively. LBT may be used in the unlicensed bands. Carrier sensing via LBT may be used for fair sharing of an unlicensed spectrum. Carrier sensing via LBT may be a consideration for fair and friendly operation in the unlicensed spectrum in a single global solution framework.

Discontinuous transmission(s) on a carrier with a limited maximum transmission duration may be provided in an LM system.

In an unlicensed spectrum, channel availability may not always be guaranteed. Continuous transmission may or may not be used. Limits on the maximum duration of a transmission burst in the unlicensed spectrum may be imposed. Discontinuous transmission with a limited maximum transmission duration may be used (e.g., as a required functionality) for LM.

Carrier selection may be considered for an LAA system. A large available bandwidth of unlicensed spectrum may be used. Carrier selection may be used for LAA nodes, e.g., to select the carriers with low interference(s). Good co-existence with other unlicensed spectrum deployments may be achieved.

Transmit power control may be considered for an LAA system. Transmit power control (TPC) may be used by which the transmitting device should be able to reduce a transmit power in a proportion of 3 dB or 6 dB compared to the maximum nominal transmit power.

RRM measurements including cell identification may be considered for an LAA system. Radio resource management (RRM) measurements (e.g., including cell identification) may enable mobility between SCells and a robust operation in an unlicensed band.

Channel-State Information (CSI) measurement (e.g., including channel and interference) may be considered for an LAA system. A WTRU operating in an unlicensed carrier may support (e.g., necessary) frequency/time estimation and/or synchronization, e.g., to enable RRM measurements and/or for a successful reception of information on the unlicensed band.

In NR (e.g., 3GPP R15 NR), a WTRU may operate using bandwidth parts (BWPs) in a carrier. A WTRU may access the cell using an initial BWP. The WTRU may be configured with a set of BWPs to continue an operation. At a given moment, a WTRU may have an active BWP (e.g., one active BWP). A BWP (e.g., each BWP) may be configured with a set of CORESETs within which a WTRU may blind decode PDCCH candidates, e.g., for scheduling, among other things.

NR may support variable transmission duration and/or feedback timing. With a variable transmission duration, a PDSCH and/or PUSCH transmission may occupy a contiguous subset of symbols of a slot. With a variable feedback timing, the DCI for a DL assignment may include an indication for the timing of the feedback for the WTRU (e.g., by pointing to a specific PUCCH resource).

A WTRU may operate in unlicensed bands for NR. NR operation in unlicensed bands may be supported. NR-based operation in an unlicensed spectrum may be specified, e.g., including one or more of an initial access, scheduling/HARQ, or mobility, e.g., along with coexistence methods with other radio access technology (RATs) (e.g., LTE-LAA and other incumbent RATs). Deployment scenarios may include one or more of different standalone NR-based operations, different variants of dual connectivity operation (e.g., EN-DC with at least one carrier operating according to the LTE RAT or NR DC with at least two set of one or more carriers operating according to the NR RAT), and/or different variants of carrier aggregation (CA), e.g., possibly also including different combinations of zero or more carriers of each of LTE and NR RATs.

LBT may be performed using clear channel assessments, e.g., on LBT subbands, which may be for example of 20 MHz. A BWP may be a single LBT subband. A BWP may include multiple LBT subbands.

The time for which a channel has been acquired for transmission may be deemed a channel occupancy time (COT) (e.g., which may be referred to as an active COT herein). The COT may be acquired by a WTRU and/or by a gNB and/or may be subsequently shared with the other node. The total COT duration (e.g., including any sharing) may not exceed the maximum COT.

A WTRU may be configured with a plurality of monitoring configurations (e.g., PDCCH monitoring configurations). For example, the WTRU may receive the plurality of monitoring configurations. The plurality of monitoring configurations may be associated with a plurality of sub-bands. For example, the plurality of monitoring configurations may be configured to be applied to one or more of the plurality of sub-bands. A WTRU may be triggered to switch or change PDCCH monitoring configuration (e.g., based on a detection of an RS or parameter of a COT). Monitoring configuration indications for wideband operation may be received by the WTRU. Hierarchical detection of monitoring configuration indication may be performed (e.g., by the WTRU). Adaptive frequency allocation of a COT may be performed based on a timing of successful channel acquisition on different LBT sub-bands. One or more rules may be used to determine valid PDCCH candidates, for example, in wideband operation. A frequency allocation of SPS in wideband operation may be determined.

A WTRU may switch between monitoring configurations. For example, a WTRU may use a first monitoring configuration until reception of a first indication. The indication may indicate that the WTRU switch to a second monitoring configuration. For example, the WTRU may determine to switch from the first monitoring configuration to the second monitoring configuration based on the first indication. The WTRU may switch to a third monitoring configuration, for example, after reception of a second indication to switch monitoring configurations. The WTRU may return to the first monitoring configuration, e.g., at a time dependent on the timing of the reception of the first indication.

The WTRU may perform wideband operation with different monitoring configurations. For example, a WTRU may be configured with a BWP made up of multiple LBT subbands. The WTRU may monitor for a first set of DM-RS resources (or COT structure indication) in some (e.g., all)

LBT subbands. Upon a reception of a DM-RS (or COT structure indication) in some LBT subbands, the WTRU may change the WTRU's PDCCH monitoring configuration for those LBT subbands. The WTRU may continue monitoring for a DM-RS(s) (or COT structure indication(s)) on other LBT subbands. At some point in the COT, the network may be able to acquire one of the other subbands. The network may transmit a signal in the acquired LBT subband indicating that LBT subband has been acquired. The network may include an updated monitoring configuration of that LBT subband.

In an unlicensed spectrum, a WTRU may not know when the gNB has acquired a channel and/or an LBT subband. The WTRU may use a static PDCCH monitoring pattern. A static PDCCH monitoring pattern may limit a gNB's opportunities to schedule a WTRU within a COT. For example, if the pattern is densified, the WTRU may have a maximum opportunity to be scheduled in a COT. If the pattern is densified, unnecessary battery may be wasted for times when there is no active COT (e.g., times when the network has not acquired the channel or LBT subband). A WTRU may be able to adapt between different monitoring configurations, e.g., depending on whether the channel is in an active COT (e.g., an on-going COT) or not. The adaptation may be dynamic, e.g., so as to not waste time after a COT has been acquired. The maximum COT duration may be 10 ms.

A WTRU may be indicated the appropriate monitoring configuration at a given time. More flexibility in PDCCH monitoring may be used to support (e.g., ensure) an appropriate use of a COT.

Figure 5:
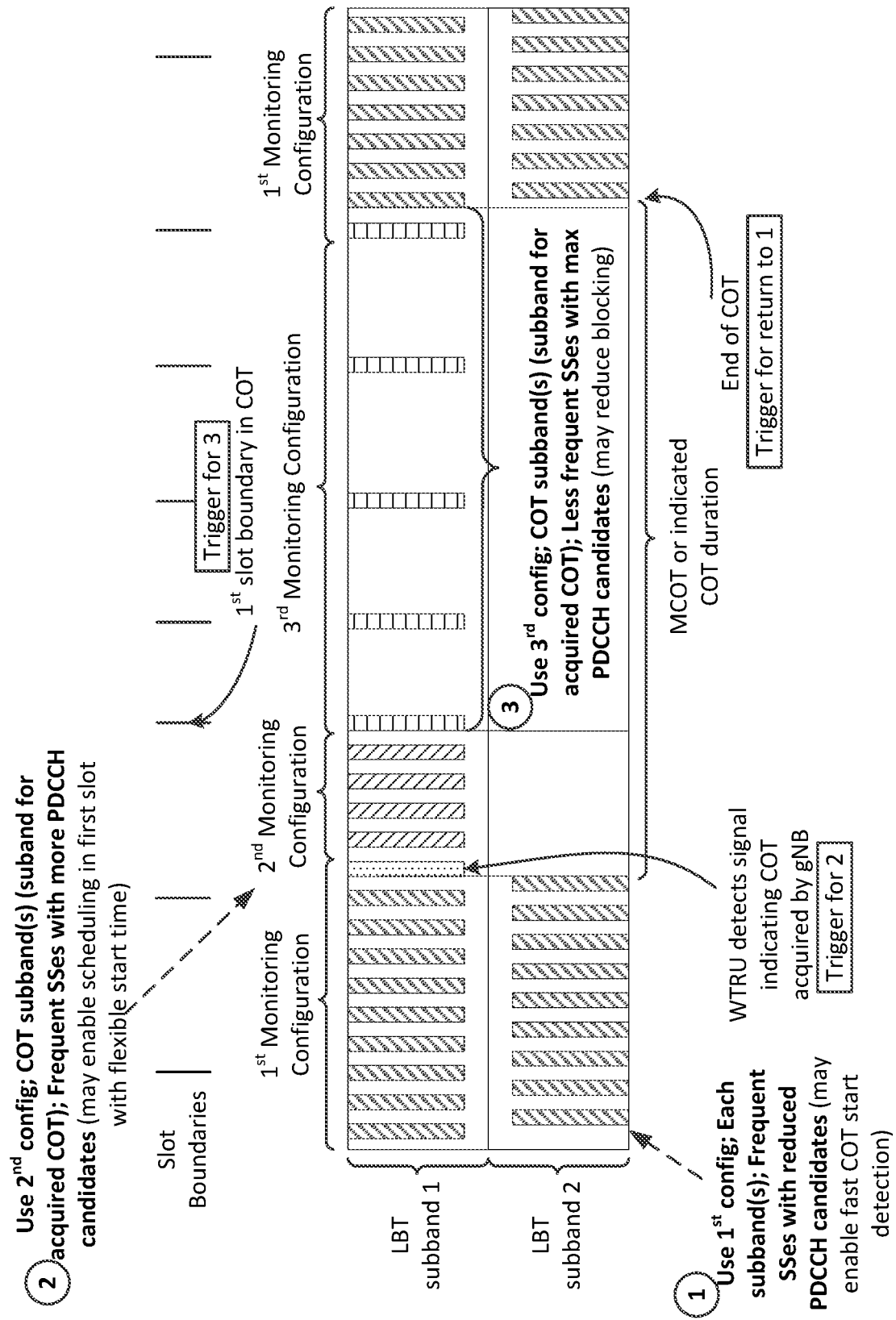
FIG. 5 illustrates an example of switching between monitoring configurations.

A BWP in an unlicensed channel may be composed of multiple LBT subbands (e.g., FIG. 5). A COT may be active in a BWP without requiring all LBT subbands to be acquired by the gNB. In such a case, the WTRU may be enabled to determine what LBT subbands of a COT are active and/or to determine the appropriate PDCCH monitoring of some or all CORESETs and search spaces within the BWP.

PDCCH monitoring behavior may be modified based on one or more indication(s).

A WTRU may be configured with parameters (e.g., a set of parameters) to determine when to attempt blind decoding (BD) of PDCCH candidates and/or on which PDCCH candidate(s) to attempt BD. For example, a WTRU may be configured with one or more of the following: one or more sets of CORESETs, one or more sets of search spaces, and/or one or more sets of PDCCH candidates per search space. The CORESETs may include regions where the WTRU may receive PDCCH DM-RS(s). The search spaces may include regions where the one or more PDCCH candidates may be mapped. One or more of the set(s) of CORESETs, search spaces, and/or PDCCH candidates may be valid (e.g., at a given moment). A WTRU may perform PDCCH BD on valid PDCCH candidates. Whether one or more of the set(s) of CORESETs, search spaces, and/or PDCCH candidates are valid at a given moment may depend on at least one of: active channel occupancy time (COT) for an LBT subband(s) where one or more of the CORESET, search space, and/or PDCCH candidate are expected, a number (e.g., a total number) of active LBT subbands, or a number of (e.g., a total number) of valid CORESETs and/or search spaces and/or PDCCH candidates. For example, the number of PDCCH candidates a WTRU monitors in an LBT subband may depend on the total number of active LBT subbands. A WTRU may determine the set of PDCCH candidates based on the total number of search spaces, e.g., as a function of the total number of search spaces in CORESETs that are present in active LBT subbands.

In examples, a WTRU may be configured with at least one monitoring configuration. The monitoring configuration may be associated with (e.g., tied to) one or more of a CORESET, search space, or PDCCH candidate. A monitoring configuration may indicate at least one of a timing of monitoring instances, a number of PDCCH candidates, a number of search spaces, or an indexation of one or more of search spaces, PDCCH candidates, or CORESETs. For example, the timing of monitoring instances may include a period and/or offset of a search space(s) (e.g., valid search spaces). The number of PDCCH candidates may be associated with the number of BDs attributed to a search space and/or CORESET.

In examples, a WTRU may have a first monitoring configuration for one of a CORESET, search space, PDCCH candidate, or combination thereof, associated with an active COT (e.g., for LBT subbands and/or unlicensed channels that are in an active COT, for example multiple subbands as illustrated in FIG. 5). A WTRU may have a second monitoring configuration for one of a CORESET, search space, or PDCCH candidates outside of an active COT (e.g., for LBT subband(s) and/or unlicensed channel(s) that are not in an active COT). A monitoring configuration of one or more of a CORESET, search space, or PDCCH candidate may depend on a number (e.g., the total number) of active LBT subbands and/or a monitoring configuration of one or more of other CORESET, other search space, or other PDCCH candidate.

A WTRU may determine whether an LBT subband (e.g., where a CORESET is located) is currently active. For example, the WTRU may determine whether the LBT subband is in an active COT, e.g., to determine a relevant monitoring configuration of one or more of a CORESET, search space, or PDCCH candidate.

Figure 2:
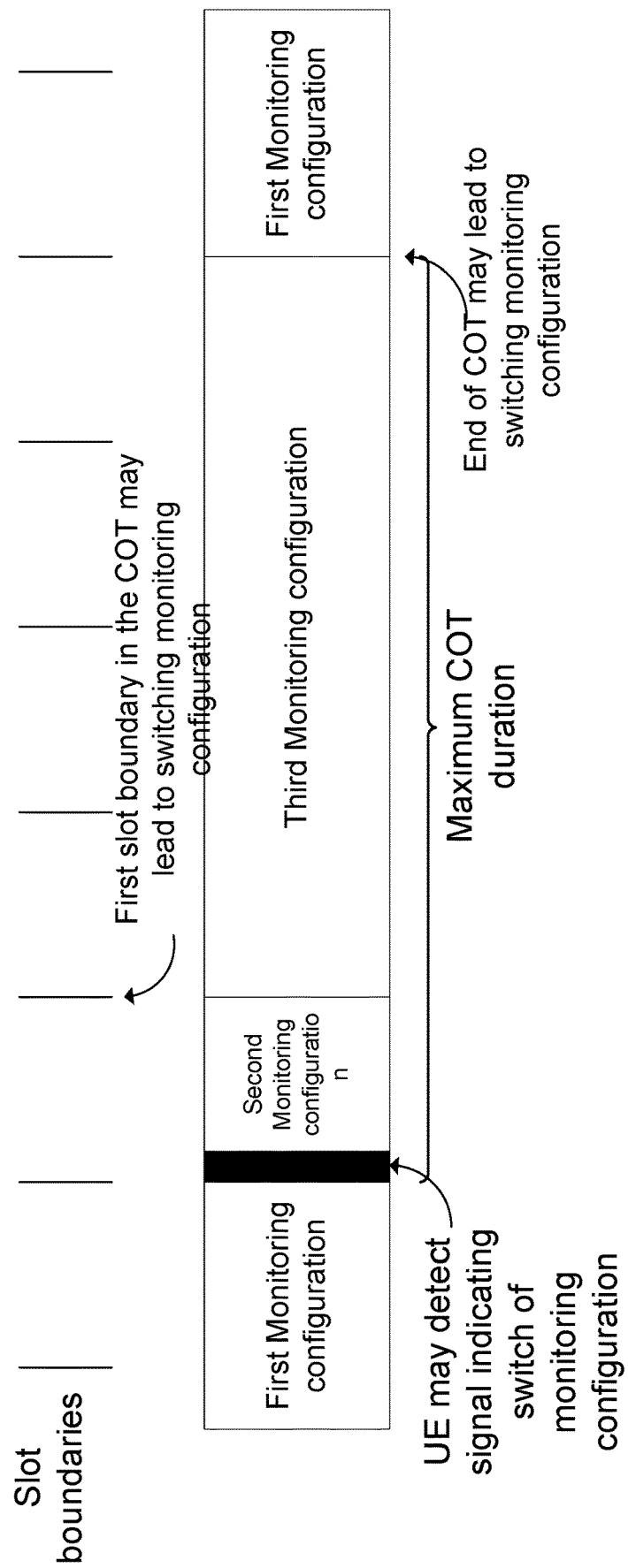
FIG. 2 illustrates an example of switching between monitoring configurations.

FIG. 2 illustrates an example of switching between monitoring configurations.

Figure 3:
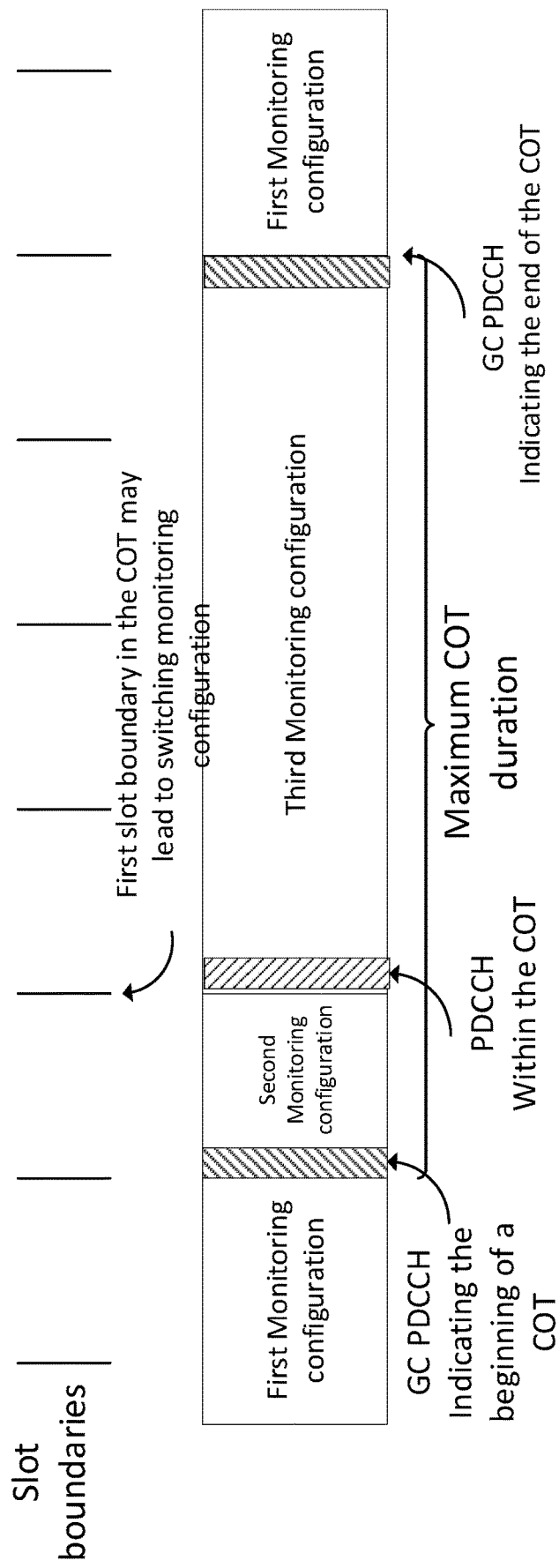
FIG. 3 illustrates an example of switching between monitoring configurations based on the PDCCH type.

FIG. 3 illustrates an example of switching between monitoring configurations based on the PDCCH type.

The WTRU may receive an indication from the gNB indicating when to switch monitoring configurations. The reception of such an indication may switch the WTRU from one monitoring configuration(s) to another monitoring configuration(s) (e.g., see FIGS. 2, 3, 4, and 5). For example, the reception of such an indication may switch the WTRU from a first monitoring configuration used for out of COT monitoring (e.g., for LBT subband(s) and/or unlicensed channel(s) that are not in an active COT, where FIG. 5 may illustrate such a plurality of subbands) to a second monitoring configuration used for a beginning slot(s) of a COT (e.g., as shown in FIGS. 2, 3, and 5). The reception of such an indication may switch the WTRU at a specific time (e.g., after reception of the indication, for example an amount of time after reception of the indication). For example, the switch may be immediate upon receiving the indication. The reception of such an indication (e.g., possibly tied to slot timing) may be used to indicate the WTRU to switch to a third monitoring configuration (e.g. used for COT monitoring for the remainder of the COT). The reception of such an indication may be used to indicate the WTRU to switch to a third monitoring configuration, for example at a second specific time (e.g., after reception of the indication, for example an amount of time after reception of the indication). For example, the second specific time may be at the first slot boundary after the reception of the indication. Reception of such an indication may indicate to the WTRU a timing (e.g., a time) at which the WTRU may return to the first monitoring configuration (e.g., at the end of the active COT duration).

FIGS. 2 and 5 illustrate an example of switching between monitoring configurations, where FIG. 5 illustrates multiple subbands. FIGS. 2 and 5 illustrate switching from a first monitoring configuration outside a COT, to a second monitoring configuration in the first slot of a COT, to a third monitoring configuration for subsequent slot(s) in the COT, and back to the first monitoring configuration (e.g., on a condition that the COT ends). In the example shown in FIGS. 2 and 5, a WTRU may use a first monitoring configuration until reception of an indication indicating to the WTRU to switch to a second monitoring configuration (e.g., where the indication may indicate a start of a COT as shown in FIGS. 2 and 5). The WTRU may on such a condition switch to a third monitoring configuration (e.g., at the first slot boundary occurring after reception of the indication to switch monitoring configuration, as shown in FIGS. 2 and 5). The WTRU may return to the first monitoring configuration, e.g., at a time indicated in the original indication (e.g., the indication indicating the WTRU to switch to the second monitoring configuration), for example at the end of the COT as indicated in FIGS. 2 and 5.

The indication indicating when to switch monitoring configurations may or may not be associated with an indication of a COT (e.g., indication of an active COT, for example start and end times of an active COT as shown in FIGS. 2 and 5). In examples, the indication of when to switch monitoring configurations may be the same as that used to indicate a start of a COT on LBT subband(s) (e.g., DM-RS). In examples, the indication of when to switch monitoring configurations may be a different signal. The indication of when to switch monitoring configurations may not need to be tied to the indication of an active COT. For example, a WTRU may receive a signal outside of a COT, for example, to modify the monitoring configuration of at least one of a CORESET, search space, or PDCCH candidate.

FIG. 5 illustrates an example of a WTRU switching between monitoring configurations. A first monitoring configuration may be used outside a COT as discussed herein. The first monitoring configuration may use frequent search spaces (SSs) with a reduced number of PDCCH candidates (e.g., less than the second monitoring configuration) as discussed herein. The second monitoring configuration may be implemented on a condition of the WTRU receiving an indication of a COT (e.g., acquired by a gNB) as discussed herein. In examples, such as is shown in FIG. 5, on a condition of the WTRU receiving the indication of the COT being acquired by the gNB for subband 1, the WTRU may monitor subband 1 and not subband 2. The second monitoring configuration may have frequent SSs with more PDCCH candidates than the first monitoring configuration, e.g., as discussed herein. The second monitoring configuration may be used for the first slot in the COT, e.g., as discussed herein. The WTRU may switch to the third monitoring configuration for subsequent slot(s) of the COT, e.g., as discussed herein. The third monitoring configuration may use less frequent search spaces (e.g., less than the first or second monitoring configurations, for example limited to the first search space in associated slots) and a maximum amount of PDCCH candidates per slot or per search space. The WTRU may switch back to the first monitoring configuration on a condition that the COT ends, e.g., as discussed herein.

A DMRS may be detected and used for changing a monitoring configuration(s).

A WTRU may be configured to detect a presence of at least one DM-RS transmission and/or may determine an appropriate monitoring configuration based on the detection of the presence of at least one DM-RS transmission. A WTRU may be configured with one or more DM-RS resources to attempt blind decoding (BD). The WTRU may be configured with a set(s) of time instances when the WTRU may attempt BD (e.g., on the one or more DM-RS resources). The DM-RS resource configuration may include at least one of the following parameters: a CORESET to which a DM-RS resource may be associated with (e.g., tied to); a PDCCH candidate or a set of PDCCH candidates on a certain monitoring occasion to which a DM-RS resources may be associated with (e.g., tied to); a search space index to which a DM-RS resource(s) may be associated with (e.g., belong to); a time location of a DM-RS resource(s) (e.g., the time location of the DM-RS resource(s) may include symbol number and/or slot number); a DM-RS sequence(s) (e.g., the DM-RS sequence(s) may include an input to a sequence generation function); DM-RS ports (e.g., DM-RS ports among 0-11); DM-RS type (e.g., DM-RS configurations type 1 and/or type 2); DM-RS maximum length (e.g., a single-symbol DM-RS or a double symbol DM-RS); additional DM-RS (e.g., those configured beside front-loaded DM-RS symbols); DM-RS CDM groups (e.g., CDM group 0, {0,1}, {0,1,2}); RE mapping; quasi-collocation to another RS.

A WTRU may use a correlation receiver and/or energy detection, for example, to detect the presence of a DM-RS. In examples, the WTRU may first attempt energy detection, and if determining that the energy is above a possibly configurable threshold, the WTRU may use a correlation receiver.

Upon a successful detection of one or multiple or all DM-RS configurations for an LBT subband and/or unlicensed channel, the WTRU may assume at least one of the following: that a COT is active in that LBT subband and/or unlicensed channel; that a COT is active for some (e.g., some or all) LBT subbands associated with (e.g., tied to) the one or more DM-RS configurations; that a monitoring configuration for some (e.g., one or all) CORESETs, search spaces, or PDCCH candidates on the one or more LBT subbands has changed.

The WTRU may assume that a COT is active in that LBT subband and/or unlicensed channel. The WTRU may modify a monitoring configuration (e.g. change monitoring configurations) of any one of a CORESET, search space, or PDCCH candidate, or any combination thereof, associated with (e.g., tied to) that LBT subband and/or unlicensed channel.

The WTRU may assume that a COT is active for some (e.g., all) LBT subbands associated with (e.g., tied to) the one or more DM-RS configurations. The WTRU may modify a monitoring configuration (e.g. change monitoring configurations) of any one of a CORESET, search space, or PDCCH candidate, or any combination thereof, associated with (e.g., tied to) the appropriate LBT subbands and/or unlicensed channel.

The WTRU may assume that a monitoring configuration for some (e.g., one or all) CORESETs, search spaces, or PDCCH candidates on the one or more LBT subbands has changed.

A parameter(s) of a detected DM-RS and/or the presence of the DM-RS may be used in association with a change of a monitoring configuration(s) (e.g., the indication of the change). The parameter(s) of the detected DM-RS and/or the presence of the DM-RS may include (e.g., indicate) at least one of the following: a CORESET to which a DM-RS resource may be associated with (e.g., tied to); a PDCCH candidate or a set of PDCCH candidates on a certain monitoring occasion to which a DM-RS resources may be associated with (e.g., tied to); a search space index to which a DM-RS resource(s) may be associated with (e.g., belong to); a time location of a DM-RS resource(s); a DM-RS sequence(s); DM-RS ports (e.g., DM-RS ports among 0-11); DM-RS type; DM-RS maximum length; additional DM-RS; DM-RS CDM groups; RE mapping; quasi-collocation to another RS.

A parameter of the detected DM-RS may indicate a set of one or more of CORESETs, search spaces, or PDCCH candidates for which the WTRU may change a monitoring configuration(s). The parameter of the DM-RS may indicate the change (e.g., a required change) in the monitoring configuration(s). As an example, if a WTRU detects a DM-RS with a first sequence, the WTRU may use a first monitoring configuration for a first search space. If the WTRU detects a DM-RS with a second sequence, the WTRU may use a second monitoring configuration for the first search space.

A parameter of a DM-RS may indicate a timing (e.g., a time) of an upcoming change in a monitoring configuration for one or more of a CORESET, search space, or PDCCH candidate. As an example, a parameter of the DM-RS may indicate to the WTRU a remaining number of symbols of a current COT. The WTRU may use the parameter of the DM-RS that indicates the remaining number of the symbols of the current COT to determine at what point the WTRU may switch from a monitoring configuration (e.g., a current monitoring configuration) to another monitoring configuration (e.g., one that is applicable for out-of-active COT monitoring). A parameter of the DM-RS may indicate to the WTRU a type of LBT used to acquire the channel for the transmission of the DM-RS. The indication of the type of LBT used to acquire the channel for the transmission of the DM-RS may enable the WTRU to determine an appropriate LBT to use for an UL transmission (e.g., an upcoming UL transmission).

A presence of a DM-RS in a time instance may indicate to (e.g., lead) the WTRU to use a first monitoring configuration in an associated time instance. A lack of DM-RS (e.g., in a time instance) may indicate to the WTRU to use a second monitoring configuration in an associated time instance. A WTRU may determine a lack of DM-RS (e.g., that there is no DM-RS present). A toggling behavior between multiple monitoring configurations may be created. For example, when a WTRU first detects a presence of a DM-RS, the WTRU may switch to a first monitoring configuration. The WTRU may maintain the first monitoring configuration until the WTRU fails to detect the presence of a DM-RS. The WTRU may switch to a second monitoring configuration when the WTRU fails to detect the presence of a DM-RS. The WTRU may maintain the second monitoring configuration until a successful detection of a DM-RS.

An association of an DM-RS with a PDCCH Type may indicate a timing of a monitoring configuration. As an example, if a DM-RS is associated with (e.g., belongs to) a Group-Common PDCCH (e.g., mainly transmitted in a Common Search Space), then the WTRU may assume that this is an indication to switch from a first to a second monitoring configuration, for example, at the beginning of a COT. If the DM-RS is associated with (e.g., belongs to) a Group-Common PDCCH (e.g., which may be transmitted in a Common Search Space), then the WTRU may assume that this is an indication to switch from a third to a first monitoring configuration, for example, at the end of the COT. This may be an implicit indication of the start and the end of a gNB initiated COT. In examples, if a DM-RS is associated with (e.g., belongs to) a PDCCH (e.g., which may be transmitted in a WTRU Specific Search Space), then the WTRU may assume that this is an indication to switch from a second to a third monitoring configuration within the COT. This may be an implicit indication of a monitoring configuration change within the gNB initiated COT. FIG. 3 illustrates an example of switching between monitoring configurations based on the PDCCH type.

A WTRU may buffer some (e.g., some or all) PDCCH candidates associated with (e.g., tied to) the same CORESET(s) as the CORESET(s) of the DM-RS resource(s), for example, while blind detecting DM-RS resources. The WTRU may determine that the DM-RS is present and/or that the monitoring configuration to which the WTRU is switching to may include PDCCH candidates in that instance of the CORESETs and/or search spaces. If such a determination occurs, the WTRU may attempt to (e.g., retroactively) perform PDCCH candidate BD on the buffered values (e.g., buffered PDCCH candidates). In examples, the WTRU may buffer PDCCH candidates in one or more of other LBT subbands, other CORESETs, and/or other search spaces. Detecting a DM-RS in at least one LBT subband, and/or at least one CORESET, and/or at least one search space may trigger blind detection over some (e.g., some or all) buffered candidates. In examples, the monitoring configuration to which the WTRU is switching to may be applicable to (e.g., only applicable to) a future occurrence of the CORESET and/or search space.

An association of an DM-RS to a DCI Format may indicate timing of a monitoring configuration. In examples, if a DM-RS is associated with (e.g., belongs to) a PDCCH which carries DCI Format 1_0 (e.g., a fallback DCI for DL assignments), the WTRU may assume that this is an indication to switch from a first to a second monitoring configuration, for example, at the beginning of the COT. If a DM-RS is associated with (e.g., belongs to) a PDCCH which carries DCI Format 1_0 (e.g., a fallback DCI for DL assignments), the WTRU may assume that this is an indication to switch from a third to the first monitoring configuration, for example, at the end of the COT. This may be an implicit indication of the start and the end of a gNB initiated COT. In examples, if the DM-RS is associated with (e.g., belongs to) a PDCCH which carries DCI Format 1_1, then the WTRU may assume that this is an indication to switch from the second to third monitoring configuration, for example, within the COT. This may be an implicit indication of the monitoring configuration change within the gNB initiated COT.

A CSI-RS may be detected and used for indicating a monitoring configuration(s)/monitoring configuration change(s).

A WTRU may be configured with one or more CSI-RS resource sets. A configured resource set (e.g., each configured resource set) may represent one or more CSI-RS configurations. A WTRU may determine one or more of PDCCH monitoring opportunities, parameters, or behavior, for example, based on a presence of certain configured CSI-RS configurations.

A CSI-RS configuration may be characterized through the CSI-RS configuration's operational features (e.g., main operational features). The operational features may include one or more of scrambling sequence, frequency features (e.g., span over RBs and/or density within RB), time features (e.g., periodic/aperiodic and/or repetition per frame), power (e.g., zero vs non-zero power), or multiplexing (e.g., number of ports and/or TDM/FDM/CDM).

A WTRU may be configured with one or more of CSI-RS configurations that have different combinations of the operational features (e.g., as described herein). A WTRU may be configured to interpret a (e.g., each) combination of the configured CSI-RS configurations as an implicit indication to a related COT activity and/or a change of the WTRU's behavior. The interpretation of the (e.g., each) combination of the configured CSI-RS configurations (e.g., correspondence between each combination of the configured CSI-RS configurations to a COT activity) may be semi-statically or dynamically configured, for example, according to at least one or more of the following: dimensions of the CSI-RS configuration, an expected channel activity and/or COT duration, or per LBT subband and/or unlicensed channel.

A WTRU may interpret features and/or parameters of a detected CSI-RS configuration, for example, if the WTRU successfully detects the presence of at least one of the configured CSI-RS configurations, as an indication of at least one of the following events: an active COT in the LBT subband, an expected duration of COT, a presence of a CORESET (e.g., an already defined or a new CORESET), or information about the search space.

In examples, a 2-port CDM configuration may indicate an active COT with a first search space. A 4-port CDM may indicate a COT activity with a second search space.

In examples, a WTRU may determine a QCL property between a PDCCH DMRS and a configured CSI-RS, for example, from TCI information contained in a CORESET definition. In examples, a WTRU may assume the PDCCH DM-RS and the configured CSI-RS are QCL-ed for a duration of a COT.

Monitoring may be performed for a COT structure indication.

A WTRU may be configured to monitor for a DCI that indicates a COT structure and/or schedules a transmission with the COT structure. A WTRU may be configured with a set of PDCCH monitoring parameters or configurations to monitor for the DCI. Such parameters may be configured and/or used based on (e.g., depend on) whether there is an active COT or not. For example, a WTRU may detect a COT structure indication outside of a COT. The WTRU may have a first set of PDCCH monitoring configurations to be used to attempt to detect the COT structure indication. If (e.g., upon) a COT is activated, the WTRU may switch to a second (e.g., different) set of PDCCH monitoring configurations. The WTRU may be enabled to receive an update on a COT structure, for example, for an ongoing COT. The update may be received via a monitoring occasion, e.g., a monitoring occasion in the second set of PDCCH monitoring configurations.

CORESETs and/or search spaces and/or PDCCH candidates and/or DCI type may be associated with different priorities. The CORESETs and/or search spaces and/or PDCCH candidates and/or DCI type via which a WTRU may expect to receive a COT indication may have a different priority(ties) over other CORESETs and/or search spaces and/or PDCCH candidates and/or DCI types. For example, the WTRU may monitor (e.g., always monitor) configured PDCCH candidates that may be used for a COT structure indication. In this example, if the WTRU is to (e.g., required to) drop some PDCCH candidates, the WTRU may drop other PDCCH candidates before dropping candidates that may be used for the COT structure indication. For instance, the WTRU may be required to drop some PDCCH candidates due to WTRU blind detection restrictions.

The WTRU may expect a COT structure indication if (e.g., only if) the WTRU receives an indication that an LBT subband has been acquired. The WTRU may receive an indication that the LBT subband has been acquired, for example, via the reception of a DM-RS. The WTRU may attempt blind detection of a DCI for a COT structure indication if (e.g., only upon) the WTRU is triggered, for example, by the reception of a previous signal. The WTRU may continue monitoring for the COT structure indication, e.g., for a period of time. In an example, the WTRU may monitor for the COT signaling until the end of the COT. The WTRU may receive (e.g., require the reception of) another signal to restart monitoring for the COT structure indication, for example, at or after the end of the COT.

State-Based PDCCH Monitoring May be Performed

A WTRU may be configured with different PDCCH monitoring states (e.g., FIGS. 2 and 5). For example, a WTRU may be configured with a first state for out-of-COT PDCCH monitoring (e.g. state A). The WTRU may be configured with a second state for PDCCH monitoring at the beginning of a COT (e.g. state B). The WTRU may be configured with a third state for PDCCH monitoring for the remainder of the COT (e.g. state C). A CORESET and/or search space and/or PDCCH candidate may be configured with different sets of parameters. A given set of parameters may be applicable a given state. For example, each given set of parameters may correspond to each possible state. For example, search spaces may have different monitoring periodicity, e.g., a first monitoring periodicity in state A, a second monitoring periodicity in state B, and a third monitoring periodicity in state C. In examples, the number of PDCCH candidates to be monitored in a search space may depend on a PDCCH monitoring state.

Transitioning may be performed, for example, from one state to a next state (e.g., FIGS. 2 and 5).

A WTRU may transition from a first state to a second state. The WTRU may be configured with rules to determine when to transition from a first PDCCH monitoring state to a second (e.g., a next) PDCCH monitoring state. The order of transitions may be determined (e.g., fixed). For example, the order of transitions may include transitioning from state A to state B, from state B to state C, and from state C to state A. The rules for transitioning may include at least one of: timing relative to a previous transition, absolute timing, timing of a current COT, information in a COT structure indication, dynamic indication, or lack of an expected signal.

The rules for transitioning may include timing relative to a previous transition. For example, a WTRU may transition from state C to state A based on the timing of a prior (e.g., an immediately preceding) transition, e.g., from state A to state B. The value of the timing between the transitions (e.g., between the transition from state C to state A and the transition from state A to state B) may be fixed or may be indicated. For example, the timing may be indicated in a signal that is received upon the transition from state A to state B. The timing may be indicated in a signal that is received during the preceding state B or during the current state C.

The rules for transitioning may include absolute timing. For example, the WTRU may transition from state B to state C based on a slot boundary.

The rules for transitioning may include timing of a current COT. For example, the WTRU may make different transitions (e.g., transition from state B to state C or from state C to state A) based on the current timing of a COT. In examples, upon a specific time measured from the beginning of a COT, the WTRU may perform a state transition.

The rules for transitioning may be based on information in a COT structure indication. The WTRU may determine when to transition from a first state to a second (e.g., next) state based on information provided in a COT structure indication. The information may be implicit. For example, the reception of the COT structure indication may lead to a state transition. The information may be explicit. For example, the COT structure indication may provide the timing of an upcoming state transition.

The rules for transitioning may be based on a dynamic indication(s). The WTRU may be dynamically indicated to perform a state transition. For example, upon detection and reception of a DM-RS, the WTRU may perform a state transition.

The rules for transitioning may be based on lack of an expected signal. A WTRU may expect a transmission from the network to occur on specific resources. The WTRU may be triggered to perform a state transition, e.g., by the lack of detection of and/or lack of reception of such a signal. For example, the WTRU may expect the transmission of a signal indicating that a COT is active. If the WTRU does not receive such a signal, the WTRU may transition to state A. In examples, the WTRU may transition to state A regardless of what state WTRU was previously in.

A WTRU in DRX may operate with an assumption (e.g., a fixed assumption) on the monitoring state during its ON duration. The WTRU may use a PDCCH monitoring configuration that may be configured for DRX monitoring. In examples, the monitoring configuration used for ON durations may reuse that of a state (e.g., an aforementioned state such as state A). If the WTRU receives a transmission, the WTRU may transition to a different state. The WTRU's ON duration may coincide with an ongoing COT. If the WTRU's ON duration coincides with an ongoing COT, the WTRU may (e.g., need to) transition, for example, from state A to state C. The WTRU may determine whether to transition to a first state or a second state (e.g., from state A to state C or from state A to state B) based on at least one of: the timing of the reception of the transmission, an indication from the gNB, or a COT structure indication.

The WTRU may determine whether to transition to a first state or a second state (e.g., from state A to state C or from state A to state B) based on the timing of the reception of the transmission. For example, based on (e.g., depending on) the CORESET and/or search space and/or PDCCH candidate where the WTRU received the transmission in its ON duration, the WTRU may determine the state to transition to. Based on (e.g., depending on) the absolute time of the reception of the transmission, the WTRU may determine the state to which the WTRU may transition to.

The WTRU may determine whether to transition to a first state or a second state (e.g., from state A to state C or from state A to state B) based on an indication from the gNB. For example, the WTRU may receive an indication (e.g., in the DCI), indicating or pointing to an appropriate state to transition to.

The WTRU may determine whether to transition to a first state or a second state (e.g., from state A to state C or from state A to state B) based on a COT structure indication. The WTRU may receive a COT structure indication that may enable the WTRU to select an appropriate state to transition to.

Monitoring may be performed outside of the COT.

A WTRU may be configured with a monitoring configuration to be used outside of an active COT (e.g. in state A). In such a state, the WTRU may assume a reduced number of PDCCH blind detects (e.g., FIG. 5).

In examples, PDCCH monitoring outside of a COT may be bursty. The WTRU may save power. For example, the WTRU may have bursts of monitoring occasions. The WTRU may not have periodic monitoring occasions. Bursts (e.g., each burst) may occur in a periodic fashion.

A WTRU may perform PDCCH monitoring within a COT. The WTRU may use a monitoring configuration for one or more of a CORESET, search space, or PDCCH candidate for BD of PDCCH candidates transmitted within a COT. The monitoring configuration may provide periodicity and/or offset of monitoring occasions. In examples, some parameters of the monitoring configuration to be used during a COT (e.g., an active COT) may depend on parameters of the COT. Timing of the monitoring occasions of a monitoring configuration may be determined by one or more of the following: timing of the COT; true time (e.g., the absolute time); an LBT subband; the number (e.g., the total number) and/or the set of LBT subbands used in a COT; the number (e.g., the total number) of one or more of CORESETs, search spaces, or PDCCH candidates; a number (e.g., total number) of carriers; a number (e.g., a total number) of active COTs; a number (e.g., a total number) of carriers without an active COT; a number (e.g., a total number) of monitored PDCCH candidates within a COT; or a number (e.g., a total number) of non-overlapped CCEs within a COT.

Timing of the monitoring occasions of a monitoring configuration may be determined by timing of the COT. In examples, the starting symbol and/or slot of a COT may enable the WTRU to determine an offset of a monitoring configuration. In examples, the timing of a first full slot of a COT may enable the WTRU to determine an offset of a monitoring configuration.

Timing of the monitoring occasions of a monitoring configuration may be determined by true time (e.g., the absolute time). For example, a slot number may be used to determine a validity of a monitoring occasion.

Timing of the monitoring occasions of a monitoring configuration may be determined by an LBT subband. For example, the periodicity and/or offset of a monitoring occasion in a monitoring configuration may depend on the LBT subband where a PDCCH is blind detected.

Timing of the monitoring occasions of a monitoring configuration may be determined by the number (e.g., the total number) and/or the set of LBT subbands used in a COT. For example, if fewer than x LBT subbands are active in a COT, the WTRU may assume a first monitoring periodicity for at least one monitoring configuration. If more than x LBT subbands are active in a COT, the WTRU may assume a second monitoring periodicity for at least one monitoring configuration.

Timing of the monitoring occasions of a monitoring configuration may be determined by the number (e.g., the total number) of one or more of CORESETs, search spaces, or PDCCH candidates. For example, if a COT has (e.g., only has) a single CORESET, the WTRU may assume a first set of parameters for a monitoring configuration for PDCCH candidates in that CORESET. If a COT has multiple CORESETs, the WTRU may assume a second set of parameters for the monitoring configuration(s) associated with (e.g., tied to) each CORESET.

Timing of the monitoring occasions of a monitoring configuration may be determined by a number (e.g., total number) of carriers. For example, depending on the total number of active carriers, the WTRU may apply a specific monitoring configuration and/or set of parameters to a monitoring configuration to at least one of a CORESET, search space, or PDCCH candidate.

Timing of the monitoring occasions of a monitoring configuration may be determined by a number (e.g., a total number) of active COTs. For example, a WTRU may have multiple non-contiguous COTs in a carrier. A COT may include a set of contiguous LBT subbands where the channel has been acquired by either the gNB or the WTRU. In examples, the WTRU may have multiple active COTs (e.g., with a maximum of one per carrier). In examples, depending on the total number of active COTs, the WTRU may select appropriate parameters for a monitoring configuration.

Timing of the monitoring occasions of a monitoring configuration may be determined by a number (e.g., a total number) of carriers without an active COT. The number of carriers without an active COT may affect parameters of a monitoring configuration, e.g., given that the WTRU complexity may be affected. The WTRU complexity may be affected due to requirements that a WTRU continues to monitor a signal (e.g., DM-RS) in the carriers without active COT to determine when a COT begins and/or when to switch monitoring configurations on those carriers.

Timing of the monitoring occasions of a monitoring configuration may be determined by a number (e.g., a total number) of monitored PDCCH candidates within a COT. For example, the WTRU may be expected to monitor PDCCH candidates for up to a certain number of sizes of DCI formats within the COT. The WTRU may count the number of sizes for DCI formats in a (e.g., each) COT based on a number of configured PDCCH candidates in respective search space sets.

Timing of the monitoring occasions of a monitoring configuration may be determined by a number (e.g., a total number) of non-overlapped CCEs within a COT. For example, the WTRU may not expect to be configured with a monitoring configuration that results to corresponding total numbers of monitored PDCCH candidates and non-overlapped CCEs per COT that exceed the corresponding maximum numbers per COT.

In examples, e.g., depending on the timing of a COT, the WTRU may switch between monitoring configurations. For example, upon reception of an indication that a COT has begun, a WTRU may use a first monitoring configuration. At a specific amount of time from the beginning of the COT, the WTRU may use a second monitoring configuration. The amount of time from the beginning of the COT may be determined as an offset from the beginning of the COT. In examples, a switch from the first to second monitoring configuration may depend on a combination of the COT timing and absolute timing. For example, the WTRU may switch monitoring configurations at a specific slot boundary within the COT (e.g. at the first slot boundary). In examples, the switch from the first to second monitoring configuration may depend on numerology including one or more of subcarrier spacing, CP size, or slot duration.

A WTRU may perform PDCCH monitoring for a wideband operation.

A WTRU may be configured with a bandwidth part (BWP) that is composed of multiple LBT subbands. Transmissions between the gNB and the WTRU and/or between multiple (e.g., two) WTRUs may be possible even if the entire BWP has not been successfully acquired. The WTRU may determine whether the entire BWP has been successfully acquired by determining a clear channel using, for example, LBT per LBT subband. For a gNB acquired COT and/or for a COT acquired by another WTRU, a WTRU may be required to monitor for transmissions on at least one LBT subband of the BWP. Such transmissions may indicate to the WTRU at least one of: COT timing, COT configuration in frequency, or PDCCH monitoring configuration. The COT timing may include one or more of the starting symbol and/or slot, the duration of the COT, or the last symbol/slot of the COT. The COT configuration in frequency may include one or more of the number or identity of LBT subbands that have been acquired for the COT, or the number of non-contiguous components of the COT. The PDCCH monitoring configuration may be associated with the indication that may be used by the WTRU to determine the monitoring configuration of at least one CORESET and/or search space, and/or PDCCH candidate in at least one LBT subband.

In examples, the WTRU may be configured to monitor at least one DM-RS (or COT structure indication) in at least one LBT subband. Upon detection of a DM-RS (or COT structure indication), the WTRU may assume that, for at least one CORESET, at least one search space, and/or at least one PDCCH candidate, the WTRU will change or modify a monitoring configuration. Upon detection of a DM-RSm (or COT structure indication), the WTRU may assume that at least one associated LBT subband is in active COT. In some configurations, the WTRU may have a one-to-one mapping between a DM-RS (or COT structure indication) and a CORESET and/or search space and/or PDCCH candidate. In such a configuration, upon detection of the DM-RS resource (or COT structure indication), the WTRU may modify or change a monitoring configuration of the mapped CORESET and/or search space and/or PDCCH candidate. In examples of configurations, the WTRU may have a one-to-many mapping between a DM-RS and at least two CORESETs and/or search spaces and/or PDCCH candidates. In such a configuration, upon detection of the DM-RS resource, the WTRU may modify or change monitoring configurations of the at least two CORESETs and/or search spaces and/or PDCCH candidates. In examples of configurations, the WTRU may have a many-to-one mapping between at least two DM-RS resources and one CORESET and/or search space and/or PDCCH candidate. In such a configuration, upon detection of one, some, or all DM-RS resources, the WTRU may modify or change a monitoring configuration of the CORESET and/or search space and/or PDCCH candidate. The WTRU may assume a one-to-one, one-to-many, and/or many-to-one mapping between a presence of a DM-RS resource and an activation of a COT for an LBT subband (e.g., as described herein).

The mapping between a DM-RS resource and the associated CORESET and/or search space and/or PDCCH candidate may be configured (e.g., explicitly) by semi-static or dynamic signaling. The mapping between a DM-RS resource and the associated CORESET and/or search space and/or PDCCH candidate may be done implicitly. For example, depending on the resources on which the WTRU detects the DM-RS, the WTRU may determine the set of CORESETs and/or search space and/or PDCCH candidates for which it should modify or change the monitoring configuration.

A WTRU may be indicated (e.g., explicitly by the gNB) to modify or change a monitoring configuration for a specific LBT subband and/or CORESET and/or search space and/or PDCCH candidate. For example, the WTRU may monitor a first search space in a first LBT subband. The WTRU may receive a DCI indicating a change of a monitoring configuration for a second LBT subband and/or CORESET and/or search space and/or PDCCH candidate.

Configuration of DM-RS(s) may be detected.

The WTRU may be configured to monitor a set of DM-RS resources. Such a set may enable granularity in determining which LBT subbands are in active COT. Such a set may enable granularity in determining the multiple CORESETs and/or search spaces and/or PDCCH candidates for which the monitoring configuration is to be changed. In examples, the WTRU may monitor some (e.g., all) DM-RS configurations simultaneously. The DM-RS configurations (e.g., each of them) may have different timing. The WTRU may monitor some of the configured DM-RS resources. One or more of the following examples may be used. The WTRU may always monitor all configured DM-RS resources. The WTRU may monitor a DM-RS configuration only if all LBT subbands are considered out of active COT. The WTRU may monitor a DM-RS configuration only if an associated LBT subband is not considered in active COT. The WTRU may monitor a DM-RS configuration only if the monitoring configuration of an associated CORESET and/or search space and/or PDCCH candidate is used for out of active COT monitoring.

A WTRU may use hierarchical DM-RS monitoring. For example, the WTRU may monitor a first DM-RS resource or a first set of DM-RS resources. The WTRU may begin monitoring a second set of DM-RS resources, for example, upon a successful detection of the first or the first set of DM-RS resource(s). The WTRU may modify a monitoring configuration of at least one CORESET and/or search space and/or PDCCH candidate, for example, upon a successful detection of the first or the first set of DM-RS resource(s). The presence or the detection of the presence of the second set of DM-RS resources may indicate (e.g., initiate) the WTRU to attempt to detect at least one of a third set of DM-RS resources. And so on. As an example, a WTRU may have a first DM-RS resource configuration that spans one or more LBT subbands. Upon detecting a DM-RS on that resource, the WTRU may begin BD of a second set of DM-RS resources, e.g., each possibly spanning a single LBT subband (e.g., of the one or more LBT subbands).

The WTRU may determine the order of a DM-RS resource detection based on at least one of the following: channel measurements; prior LBT attempts; prior frequency composition of a COT; an indication(s) by a gNB; a measurement value(s) that the WTRU obtained in detection of a previous DM-RS; a semi-static configuration by a gNB; a presence or lack thereof of a DM-RS in a specific subband of a BWP; or a DM-RS indexation.

The WTRU may determine the order of a DM-RS resource detection based on channel measurements. For example, a WTRU may perform channel occupancy measurements on a set of LBT subbands (e.g., outside of a COT). Based on interference levels that the WTRU observes, the WTRU may adapt the order in which the WTRU monitors DM-RS resources.

The WTRU may determine the order of a DM-RS resource detection based on prior LBT attempts. For example, the WTRU may have previously attempted to acquire one or more LBT subbands (e.g., for UL transmissions). The WTRU may modify the order with which the WTRU monitors DM-RS resources based on whether the WTRU successfully acquired the one or more LBT subbands.

The WTRU may determine the order of a DM-RS resource detection based on prior frequency composition of a COT. For example, the WTRU may monitor a DM-RS(s) associated with (e.g., tied to) LBT subbands that were activated in a prior COT. A timer (e.g., expiration timer) may be used. For example, the WTRU may prioritize a DM-RS for a previously used LBT subband for (e.g., only) a configurable amount of time. The timer may be reset, e.g., whenever the LBT subband is acquired for a COT. Upon expiration of the timer, the WTRU may no longer prioritize such a DM-RS configuration.

The WTRU may determine the order of a DM-RS resource detection based on an indication(s) by a gNB. For example, a WTRU may be indicated in a transmission by the gNB (e.g., in a first COT) the order of DM-RS detection for a second (e.g., future) COT.

The WTRU may determine the order of a DM-RS resource detection based on a measurement value(s) that the WTRU obtained in detection of a previous DM-RS. For example, the WTRU may determine measurement values for subsets of REs of a DM-RS resource. Such measurement values may affect the order of DM-RS detection attempts (e.g., future DM-RS detection attempts).

The WTRU may determine the order of a DM-RS resource detection based on a semi-static configuration by a gNB.

The WTRU may determine the order of a DM-RS resource detection based on a presence or lack thereof of a DM-RS in a specific subband of a BWP.

The WTRU may determine the order of a DM-RS resource detection based on a DM-RS indexation. The WTRU may prioritize DM-RS resources based on an index of the DM-RS. For example, if a WTRU is configured to monitor multiple DM-RSs (e.g., simultaneously), the WTRU may prioritize some DM-RS resources over others, e.g., based on the WTRU's processing capability. The number of DM-RSs monitored by the WTRU may vary, e.g., depending on the number of carriers with currently active COTs. The WTRU's processing capability may be affected by the number of PDCCH candidates to be blind detected (e.g., simultaneously). For example, the WTRU may have a first set of carriers with an active COT(s), e.g., leading to a number x of PDCCH candidates to monitor in a slot. The WTRU may be expected to BD DM-RS resources (e.g., simultaneously) in the second set of carriers. The second set of carriers may include those without an active COT(s). Depending on the combination of a number (e.g., a total number) of PDCCH candidates and DM-RS resources, the WTRU may prioritize (e.g., need to prioritize) and/or possibly drop some DM-RS resource blind detections.

In examples, the WTRU may be configured with a DM-RS resource to blind detect by a transmission in a COT. For example, the WTRU may receive a transmission in a first LBT subband, and/or the transmission may alter the DM-RS configuration of a second LBT subband.

COT frequency allocation may be performed adaptively.

Figure 4:
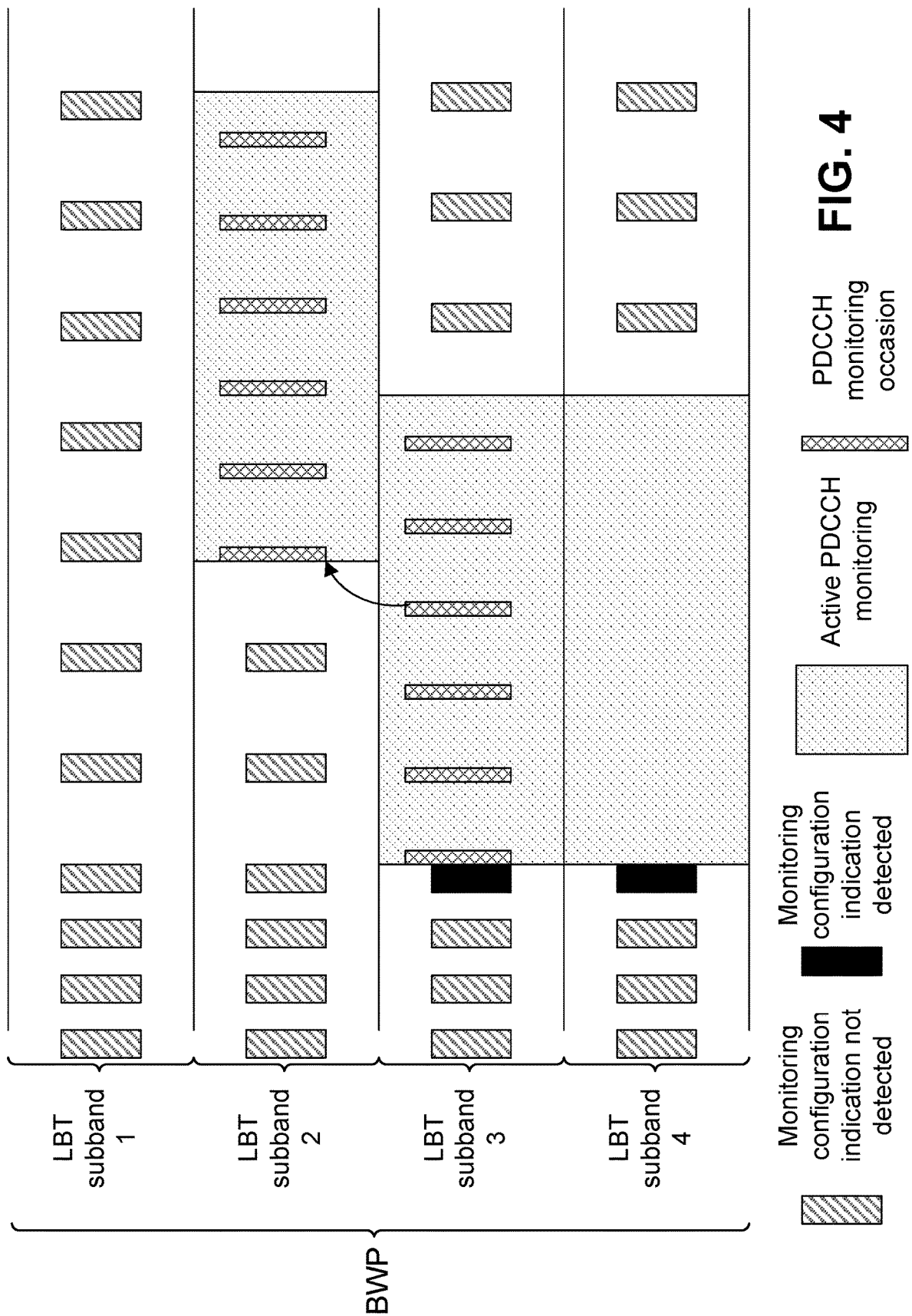
FIG. 4 illustrates an example of wideband operation with different monitoring configurations.

For a CORESET and/or search space and/or PDCCH candidate, the WTRU may have multiple (e.g., three) monitoring configurations (e.g., FIGS. 2, 3, and 4). A first monitoring configuration may be used for out-of-COT operation. A second monitoring configuration may be used for a first symbol(s)/slot(s) of a COT. A third monitoring configuration may be used for the remaining symbol(s)/slot(s) of a COT. The COT may be active for a subset of LBT subbands, e.g., for wideband. The WTRU may operate with different monitoring configurations, e.g., depending on whether one or more of a CORESET and/or search space and/or PDCCH candidate is in an LBT subband that is part of the COT or not (e.g., see FIG. 5).

The WTRU may be indicated or may assume a timing to switch from an active COT monitoring configuration to an out-of-active COT monitoring configuration. Such timing may be LBT subband independent. The WTRU may be indicated, e.g., via either DM-RS BD or via a transmission(s) from the gNB, when to switch a monitoring configuration for an LBT subband from an out-of-active COT configuration to an active COT configuration. An adaptive and/or flexible COT frequency allocation may be enabled (e.g., by the indication described herein). The WTRU may be served by a different set of LBT subbands of the WTRU's active BWP at a given moment, e.g., using the adaptive and/or flexible COT frequency allocation.

The DM-RS BD configuration and/or the monitoring configuration of one or more of the CORESETs and/or search spaces and/or PDCCH candidates may depend on whether there is no currently active LBT subband. The DM-RS BD configuration and/or the monitoring configuration of one or more of the CORESETs and/or search spaces and/or PDCCH candidates may depend on the number and/or identity(ies) of active LBT subbands. For example, if a single LBT subband is active, the WTRU may use a first set of monitoring configurations on one or more of the CORESETs and/or search spaces and/or PDCCH candidates (e.g., transmitted within that LBT subband). If there are multiple active LBT subbands, the WTRU may use a second set of monitoring configurations on one or more of the CORESETs and/or search spaces and/or PDCCH candidates (e.g., transmitted in the active LBT subbands). In examples, a WTRU may monitor PDCCH on a first LBT subband if (e.g., only if) the first LBT subband is the only active LBT subband. If there are multiple active LBT subbands, e.g., including the first LBT subband, the WTRU may not monitor PDCCH on the first LBT subband.

FIG. 4 illustrates an example of wideband operation with different monitoring configurations. FIG. 4 shows an example of a WTRU configured with a BWP made up of 4 LBT subbands. The WTRU may first monitor for a first set of DM-RS (or COT structure indication) resources in some (e.g., some or all) LBT subbands. Upon a reception of a DM-RS (or COT structure indication) in LBT subbands 3 and 4, the WTRU may change the WTRU's PDCCH monitoring configuration for those two LBT subbands. In the example shown in FIG. 4, the monitoring configuration may be dependent on the number of active LBT subbands. After reception of the DM-RS (or COT structure indication) in LBT subbands 3 and 4, the active LBT subbands include subbands 3 and 4, as shown in FIG. 4. In this example and for this combination of active LBT subbands, the WTRU may monitor PDCCH on LBT subband 3 (e.g., and not on subband 4). The WTRU may continue monitoring for a DM-RS(s) or COT structure indication(s) on LBT subbands 1 and 2, e.g., possibly on DM-RS resources with an increased period. At some future time in the COT, the network may be able to acquire LBT subband 2. The WTRU may receive a signal in LBT subband 3 (e.g. a DCI), e.g., indicating that LBT subband 2 has been acquired. The WTRU may receive a DM-RS in LBT subband 2. The WTRU may receive either the signal (e.g., DCI) in LBT subband 3 and/or the DM-RS (or COT structure indication) in LBT subband 2. The reception of either signal may indicate to the WTRU to update the monitoring configuration of LBT subband 2.

State based PDCCH monitoring may be performed in a wideband operation.

The WTRU may maintain a different set of states for different LBT subbands or different sets of subbands. For example, the WTRU may be in state A for a first set of LBT subbands and (e.g., simultaneously) in state C for a second set of LBT subbands. State transitions may occur on one or a set of LBT subbands. The state transitions may occur on one or a set of CORESETs and/or search spaces and/or PDCCH candidates. For example, the WTRU may maintain different timers per LBT subband or set of subbands.

In examples, the WTRU may be triggered to perform state transitions on multiple LBT subbands (e.g. all LBT subbands). The state transition on the multiple LBT subbands may be to a specific state, for example, regardless of the current state associated with an LBT subband. Multiple LBT subbands may enter the same state via such transitions. For example, there may be a set of LBT subbands in state A, another set of LBT subbands in state B and yet another set of LBT subbands in state C. The WTRU may receive an indication such that all LBT subbands may transition to state A (e.g. regardless of the state each LBT subband is currently in).

In examples, a state transition occurring in an LBT subband may lead to a state transition occurring in another (e.g., associated) LBT subband. For example, if a WTRU transitions from state A to state B in a first LBT subband (e.g., based on an indication received in the first LBT subband), the WTRU may transition to state B or C in at least one other LBT subband. The WTRU may not be required to monitor (e.g., be enabled to stop monitor) for an COT structure indication in all LBT subbands, for example, upon a COT being started in a first LBT subband.

PDCCH candidate(s) may be blind decoded.

The WTRU may determine the number and/or identity(ies) of valid PDCCH candidates in a search space. The determination may depend on the number of search spaces in a slot. The determination may depend on the number of active carriers in a slot. The determination may depend on the number of active carriers with active COT in a slot. The determination may depend on a number of active LBT subbands in a slot. The determination may depend on the number of concurrent DM-RS resources on which a WTRU may perform BD, in a slot. The determination may depend on the number of active CORESETs in a slot. The determination may depend on the number of active search spaces in a slot. The determination may depend on a monitoring configuration(s) of the CORESET and/or search space in which the PDCCH candidates are transmitted. The determination may depend on a monitoring configuration(s) of other CORESETs and/or search spaces and/or PDCCH. The determination may depend on an index. For example, the index may include one or more of an LBT subband index, or a CORESET index, or a search space index or a PDCCH candidate index, or a carrier index, or a COT index. The determination may depend on timing of the COT, e.g., whether the COT has just started (e.g., the first symbols of a COT) or whether the COT is about to expire. The determination may depend on a previous use of the PDCCH candidate(s) within the COT. The determination may depend on channel occupancy measurements on the resources used by the PDCCH candidate(s). The determination may depend on an LBT category. The time unit of a slot is used herein. The time unit of a slot may be generalized to any time unit.

Control signaling may be mapped in frequency.

The WTRU may be configured with one or more CORESET(s) and/or search space(s) and/or PDCCH candidate(s). The mapping of one or more CORESET(s) and/or search space(s) and/or PDCCH candidate(s) to resources (e.g., in frequency) may be based on the set of acquired LBT subbands. For example, a search space may be mapped to one of multiple LBT subbands. Depending on the set of acquired LBT subbands, the WTRU may determine the frequency resources used for that search space. In such an example, a CORSET and/or search space and/or PDCCH candidate may hop to different frequency locations (e.g. in different LBT subbands) based on (e.g., as a function of) the acquired set of LBT subbands.

A search space may have multiple instances, for example, in frequency and/or time domain within a slot. A search space (or search space set) and/or CORESET may be mapped to multiple locations in a slot, for example, multiple locations in frequency and time in a slot. A search space may be mapped to resources in different LBT subbands within a slot. The WTRU may expect some or all parameters of a search space (or search space set) and/or CORESET to be fixed except for a certain location(s). Parameters of a search space may include an associated beam (or quasi-co-location QCL of the transmission using the associated beam). Parameters of a search space may include periodicity (e.g. the slots when a search-space is present). Parameters of a search space may include the number of PDCCH candidates for an aggregation level (e.g., each aggregation level). For example, the WTRU may expect the parameters of a search space (or search space set) or CORESET to be fixed except for the frequency and time location of instances of the search space within a slot.

The WTRU may be configured with an offset in frequency. For example, the WTRU may be configured with an offset for each instance of the search space in frequency. The offset for an instance of a search space may be relative to at least one of: the resources of a first (or main) instance of the search space; the resources of another instance of the search space; the resources of an LBT subband (e.g., each LBT subband); the center frequency of the carrier; the resources used for an in-carrier guard band; a resource indicated by a COT structure indication; and/or the like.

The WTRU may be configured with an offset for an instance of a search space relative to the resources of a first (or main) instance of the search space.

The WTRU may be configured with an offset for an instance of a search space relative to the resources of another instance of the search space. For example, the search space instances may be indexed. A search space instance with index i may be mapped to resources that are offset from a search space instance with index i−1.

The WTRU may be configured with an offset for an instance of a search space relative to the resources of an LBT subband (e.g., each LBT subband). For example, each instance of the search space (or CORESET) may be associated with a different LBT subband. The resources associated with a search space instance may be defined in terms of the resources of the LBT subband within which the search space instance is located, for example, using the offset.

The WTRU may be configured with an offset for an instance of a search space relative to the center frequency of a carrier. The search space may be on the carrier.

The WTRU may be configured with an offset for an instance of a search space relative to the resources used for an in-carrier guard band. In examples, each LBT subband may contain an in-carrier guard band. The in-carrier guard band may be at the LBT subband's border.

The WTRU may be configured with an offset for an instance of a search space relative to a resource(s) indicated by a COT structure indication. The resource(s) used to indicate the COT structure may be used to determine the location of an instance of the search space. The resources used to transmit a GC-PDCCH to indicate that the gNB has acquired a COT may be used to determine the location of an instance of the search space. In certain examples, the COT structure may provide a reference resource. The WTRU may determine the location of a search space instance based on the reference resource.

The WTRU may be configured with multiple types of search spaces. The types of search spaces may include one or more of the following: search spaces to be monitored at each time, for example, at all times; search spaces of a first set; and search spaces of a second set. Search spaces of the first set may be monitored outside an active COT. Search spaces of a second set may be monitored during an active COT. In examples, the WTRU may be configured with at least three types of search spaces as described herein.

The WTRU may be configured with a search space(s) to be monitored at each time, for example, at all times. For a search space to be monitored at each time, the WTRU may monitor the instances of the search space (e.g., all instances of the search space). The WTRU may attempt to blind decode PDCCH candidates, for example, in any instance of the search space in frequency and time in the slot.

The WTRU may be configured with a search space(s) to be monitored outside of an active COT. For the search space to be monitored outside an active COT, the WTRU may monitor the instances of the search space (e.g., all instances of the search space). The WTRU may attempt to blind decode PDCCH candidates, for example, in any instance of the search space in frequency and time in the slot.

The WTRU may be configured with a search space(s) to be monitored during an active COT. In the case where a search space is to be monitored during an active COT, the WTRU may not need to monitor all instances of the search space. For example, the WTRU may monitor search space instances located in LBT subbands which have been acquired for the COT. The WTRU may determine the set of active LBT subbands based on an indication that is received from the gNB. The WTRU may determine the set of active LBT subbands based on the outcome of an LBT, for example, an LBT that is performed by the WTRU to acquire the COT.

One or more features described herein may be used to reduce blind detection.

The number of PDCCH candidates in a search space may depend on the number of LBT subbands that are active within a COT. For example, the WTRU may monitor each instance (e.g., all instances) of a search space that are located in active LBT subbands. The number of PDCCH candidates in the search space (e.g. over the instances of the search space) may depend on the total amount of resources for the search space. The total amount of resources for the search space may scale linearly with the number of active LBT subbands.

The WTRU may monitor a limited number of PDCCH candidates. The WTRU may have blind detection (BD) limitations and/or control channel element (CCE) channel estimation limitations. The BD and/or CCE channel estimation limitations may limit the number of PDCCH candidates that the WTRU may monitor in a slot. The WTRU may be limited to, for example, at most one search space (or search space set) per slot if the WTRU is to monitor all available instances of the search space (or search space set). The WTRU may monitor a subset of all PDCCH candidates in a search space. For example, the WTRU may only be capable of monitoring a subset of all PDCCH candidates in a search space with multiple instances, e.g., to not go over the WTRU's BD and/or CCE channel estimation limits. The WTRU may monitor a subset of available search space instances, for example, to reduce the PDCCH candidate monitoring burden. The WTRU may monitor a subset of available search space instances in a COT (e.g., FIG. 5). An available search space instance may be one that is located within an active LBT subband. The WTRU may be configured with rules to determine a subset of search space instances. Based on the rules, the WTRU may determine the subset of search space instances that the WTRU is to monitor.

Some instances within a search space may be dropped. The WTRU may monitor an instance of a search space based on, among other criteria, a priority associated with the instance of the search space. In an example, the WTRU may only be expected to monitor a single instance of a search space. A search space instance (e.g., each search space instance) may be assigned a priority. In examples, the WTRU may monitor (e.g., only monitor) the search space instance that is in an active LBT subband and that has the highest priority. The highest priority may be indicated by the highest or the lowest search space instance index.

The WTRU may determine an instance of a search space to monitor based on the set of active LBT subbands in a COT. The WTRU may select the single monitored search space instance as a function of the set of active LBT subbands in the COT. A set of active LBT subbands may be associated with a search space instance to be monitored by the WTRU. For example, each possible set of active LBT subbands may be assigned (e.g., by the network) a single search space instance to be monitored by the WTRU.

The WTRU may monitor a subset of search space instances. For example, the WTRU may be expected to monitor a subset of search space instances (e.g., more than one search space instances). The WTRU may determine the subset of monitored search space instances based on, among other criteria, a priority associated with the instance of the search space and/or the set of active LBT subbands in a COT. The WTRU may determine the subset of monitored search space instances of fixed or configurable size based on selection of a set with the highest priority or as a function of the set of active LBT subbands in the COT. The set with the highest priority may be the set of search space instances whose search space instance indices are the highest or lowest.

The WTRU may monitor a number of search space instances as allowed according to BD and/or CCE channel estimates limitations (e.g., reduce the number of possible monitored search space instances to a number that conforms with BD and/or CCE channel estimates limitations). The WTRU may monitor as many search space instances as possibly allowed without exceeding BD and/or CCE channel estimate limit. Search space instances may be ordered in terms of priority. The priority may be determined based on a search space index and/or based on the set of active LBT subbands in the COT. The WTRU may start with an empty monitored set. The WTRU may add the next available highest priority search space instance to the monitored set as long as the BD and/or CCE channel estimate limitations are not exceeded.

Some instances across multiple search spaces may be dropped.

The WTRU may determine to drop certain search spaces and/or certain search space instances. The WTRU may determine if the WTRU monitors the entirety of a search space based on the search space index, for example, for the case of multiple search spaces occurring in a slot. The WTRU may determine whether monitoring the entirety of the search space will exceed the BD and/or CCE channel estimate limitations. If a search space has multiple possible instances, the WTRU may drop a subset of search space instances, for example, instead of dropping the entirety of a search space. The WTRU may be configured with a priority for a search space (e.g., different priority per search space). The WTRU may be configured with a priority for a search space instance (e.g., different priority per search space instance within each search space). The WTRU may be configured to use a rule(s) (e.g., a dropping rule(s)) to determine which search space(s) and/or which search space instance(s) to drop, for example, in the event that either BD or CCE channel estimate limitations are exceeded. The WTRU may drop the search space(s) and/or search space instance(s) based on the dropping rule. For example, the dropping rule may provide that the priority of the search space(s) is considered first, and the priority of the search space instance(s) is considered second. In certain examples, the dropping rule may provide that the priority of the search space instance(s) is considered first, and the priority of the search space(s) is considered second.

The WTRU may determine the set of search spaces and/or search space instances to be monitored by dropping instances of the remaining lowest priority search space first, for example, until either BD and/or CCE channel estimate limitations are satisfied or until all the search space instances of the lowest priority search space are dropped. For example, if all instances of a relatively low (e.g., the lowest) priority search space are dropped, the WTRU may proceed to drop the instances of the next relatively low (e.g., the next lowest) priority search space, until the BD or CCE channel estimate limitations are satisfied. The instances may be dropped in order of priority associated with the instances.

The WTRU may determine the set of search spaces and/or search space instances to be monitored by dropping relatively low priority search space instances first (e.g., the lowest priority search space instances over all the search spaces). For example, the WTRU may first drop the lowest priority search space instance of the lowest priority search space. If the BD or CCE channel estimate limitations are not met, the WTRU may proceed to drop the lowest priority search space instance of the next lowest priority search space. This may continue until all lowest priority search space instances are dropped or until the BD and/or CCE channel estimation limitations are satisfied. The WTRU may drop the second lowest priority search space instances of some or all the search spaces, until the BD and/or CCE channel estimation limitations are satisfied. The WTRU may continue dropping higher priority search space instances, for example in the same or similar manner. Portions (e.g. instances) of multiple search spaces may be dropped, for example, rather than entire search spaces altogether.

One or more of the previous examples may be performed by ranking certain search space instances of certain search spaces first. For example, all search space instances of all the search spaces may be ranked or ordered by priority before the WTRU performs a respective example herein. The ranking or ordering may be determined by ordering the search space instances first or ordering the search spaces first.

The WTRU may drop a search space instance(s) based on the LBT subband within which they are located. In an example, the WTRU may drop a search space instance(s) as a function of the LBT subband within which they are located based on the CCE channel estimate limitation. For example, to achieve the CCE channel estimate limitation, the WTRU may drop all search space instances in a first LBT subband. If the limitation is not achieved, the WTRU may drop some or all search space instances in a second LBT subband, and so on to achieve the limitation. In this case, the LBT subbands may be associated with priority (e.g., assigned priority). The priority may depend on the set of acquired LBT subbands.

A DCI may be repeated, for example in multiple search space instances.

A WTRU may expect a DCI to be repeated in multiple search space instances. The WTRU may combine received signals, e.g., to help improve DCI robustness. In an example, a hashing function may be used to determine the PDCCH candidate in each search space instance. For example, the hashing function may be used to ensure that candidate position in each search space instance has an equivalent in the other search space instances.

The WTRU may be configured with a subset(s) of search space instances, over which the WTRU may expect PDCCH transmissions to be repeated. The WTRU may not expect a DCI to be transmitted and/or repeated in a set other than the subset(s).

The WTRU may expect a PDCCH candidate to be mapped to multiple search space instances. Mapping a PDCCH candidate to multiple search space instances may support increased aggregation levels. Higher aggregation levels may improve robustness.

A CORESET may span multiple LBT subbands.

In examples, the WTRU may be configured with one or more CORESET(s). A CORESET (e.g., each CORESET) of the one or more CORESET(s) may span multiple LBT subbands. Such CORESET(s) may be deemed activated if at least one of the following (e.g., following conditions) occurs: at least one LBT subband to which a CORESET is mapped to is determined to be in active COT; all LBT subbands, to which a CORESET is mapped to, are determined to be in active COT; more than x LBT subbands, to which a CORESET is mapped to, are determined to be in active COT. For example, x may be configurable (e.g. by semi-static or static signaling); fewer than y CORESETs have been determined to be activated at the same time (e.g. for the same COT), for example, where y may be configurable (e.g., by semi-static or static signaling). For example, a (e.g., each) CORESET may have an index, and the WTRU may consider up to y CORESETs to be activated, for example, only y CORESETs with the lowest or highest index value(s); or the WTRU receives an explicit indication (s) that a CORESET is activated or deactivated. For example, a WTRU may receive signaling that indicates the set of active CORESETs at a given moment.

It may be determined (e.g., by the WTRU) that an LBT subband is in active COT, for example, based on a detection of at least one of a DM-RS, or reception of a PDCCH (e.g., group common PDCCH), or DCI, or payload tied to a DCI.

A search space may be associated with (e.g., tied to) a CORESET. For example, the CORESET may span multiple LBT subbands. A search space may be confined to an (e.g., single) LBT subband. A search space may span multiple LBT subbands. The WTRU may determine the set of PDCCH candidates to blind decode to be those that map (e.g., entirely) to resource elements located in activated LBT subbands, for example, for the case where a search-space spans multiple LBT subbands. The resource elements may include CCEs. A search-space may be repeated in multiple LBT subbands. PDCCH candidates may be repeated in multiple LBT subbands. CCEs of a PDCCH candidate may be repeated in multiple LBT subbands. In examples, repetition of a search-space in multiple LBT subbands, repetition of PDCCH candidates in multiple LBT subbands, and/or repetition of CCEs of a PDCCH candidate in multiple LBT subbands may be used, e.g., to improve robustness to channel access. A WTRU may consider a PDCCH candidate valid if each CCE is present at least once in active LBT subbands, for example, for the case where a search-space(s) is repeated in multiple LBT subbands. In examples, the WTRU may monitor a PDCCH candidate only if each CCE is present at least once in an active LBT subband.

The WTRU may consider some (e.g., some or all) PDCCH candidates of a search space to be valid if the LBT subband is active, for example, for the case where a search-space is confined to a single LBT subband.

The WTRU may be configured with multiple search-spaces (e.g., search spaces tied to a CORESET), for example, when the WTRU is configured with the CORESET that spans multiple LBT subbands. The WTRU may be configured with at least one search space per LBT subband. The WTRU may determine that a set of the search-spaces (e.g., a subset of all the search-spaces) are valid for PDCCH monitoring, for example, when multiple LBT subbands are activated. The WTRU may determine the set of search-spaces and/or PDCCH candidates to blind decode based on, for example, a priority rule (e.g., search-space index) as described herein.

In examples, the WTRU may determine the set of CCEs that constitute a search-space based on (e.g., as a function of) a subset of active LBT subbands. The subset of LBT subbands may be a subset of all the LBT subbands that a CORESET spans (e.g. the CORESET to which the search-space is tied). The WTRU may determine a set of PDCCH candidates, for example, based on a hashing function. The hashing function may take into account the set of CCEs that is associated with (e.g., is tied to) a search-space. For example, if a CORESET includes (e.g., is composed of) a single active LBT subband, the search-space may include (e.g., defined to be composed of) CCEs located in the active LBT subband. If the CORESET includes (e.g., is composed of) the single active LBT subband, the set of PDCCH candidates associated with (e.g., composing) the search-space may be determined by a hashing function, for example, by taking into account the CCEs (e.g., only the CCEs of the active LBT subband). A different set of LBT subbands may be active, for example, in another time instance. At this another time instance, the search-space may include (e.g., composed of) a different set of CCEs located in the active LBT subband(s). The different set of CCEs located in the active LBT subband(s) may be overlapping. At this another time instance, the set of PDCCH candidates may be determined by a hashing function, for example, by taking into account the different (e.g., new) set of CCEs that constitutes the search-space.

Semi-persistent scheduling (SPS) may be performed in wideband. A WTRU may be provided multiple sets of LBT subbands within which the WTRU may receive a SPS PDSCH transmission. The WTRU may blind detect an appropriate set at a (e.g., any) given moment. The WTRU may determine the appropriate set of LBT subbands where the WTRU may expect transmission of the SPS PDSCH. The WTRU may monitor one or more DM-RS resources to make the determination. A (e.g., each) DM-RS resource may be associated with (e.g., tied to) a set of LBT subbands where the WTRU may expect SPS PDSCH. Upon a successful detection of a DM-RS resource at a configurable time, the WTRU may expect SPS PDSCH transmission in associated resources. The configurable time may be related to the timing of the SPS PDSCH transmission. The WTRU may be provided a priority rule to determine the order of a DM-RS resource or LBT subband(s) on which the WTRU should attempt BD. Depending on a timing of a previous transmission and/or a COT duration, the WTRU may expect an SPS PDSCH transmission in a set of LBT subbands (e.g., without needing to perform BD).

In examples, the instrumentalities and implementations described herein may be applied to NR, e.g., in NR licensed spectrum, in NR unlicensed spectrum, and/or other scenarios.

Although the features and elements of the present invention are described in the preferred embodiments in particular combinations, each feature or element can be used alone without the other features and elements of the preferred embodiments or in various combinations with or without other features and elements of the present invention.

Although the solutions described herein consider LTE, LTE-A, New Radio (NR) or 5G specific protocols, it is understood that the solutions described herein are not restricted to this scenario and are applicable to other wireless systems as well.

What is claimed is:

1. A wireless transmit/receive unit (WTRU) comprising:
   a processor configured to:
   determine a plurality of sub-bands for a cell;
   monitor, in accordance with a first monitoring configuration, a first search space in a first sub-band subset associated with the plurality of sub-bands, wherein the first monitoring configuration comprises an indication of the sub-bands belonging to the first sub-band subset;
   receive downlink control information (DCI) that indicates a channel occupancy time (COT) and a second sub-band subset associated with the plurality of sub-bands, wherein the indicated COT indicates a COT duration;
   monitor the first search space in the indicated second sub-band subset for a remaining duration of the COT; and
   switch from monitoring the first search space in the second sub-band subset to monitoring the first search space in the first sub-band subset based on an end of the COT.

2. The WTRU of claim 1, wherein the processor is further configured to receive a plurality of monitoring configurations associated with the plurality of sub-bands.

3. The WTRU of claim 1, wherein the DCI COT indication indicates when to switch from monitoring the first search space in the indicated second sub-band to monitoring the first search space in the first sub-band subset.

4. The WTRU of claim 1, wherein the processor is further configured to monitor, according to the first monitoring configuration for a physical downlink control channel PDCCH) candidate.

5. The WTRU of claim 1, wherein the first sub-band subset comprises each of the sub-bands in the plurality of sub-bands, and wherein the second sub-band subset comprises a portion of the sub-bands in the plurality of sub-bands.

6. A method comprising:
   determining a plurality of sub-bands for a cell;
   monitoring, in accordance with a first monitoring configuration, a first search space in a first sub-band subset associated with the plurality of sub-bands, wherein the first monitoring configuration comprises an indication of the sub-bands belonging to the first sub-band subset;
   receiving downlink control information (DCI) that indicates a channel occupancy time (COT) and a second sub-band subset associated with the plurality of sub-bands, wherein the indicated COT indicates a COT duration;
   monitoring the first search space in the indicated second sub-band subset for a remaining duration of the COT; and
   switching from monitoring the first search space in the second sub-band subset to monitoring the first search space in the first sub-band subset based on an end of the COT.

7. The method of claim 6, further comprising receiving a plurality of monitoring configurations associated with the plurality of sub-bands.

8. The method of claim 6, wherein the DCI indicates when to switch from monitoring the first search space in the indicated second sub-band to monitoring the first search space in the first sub-band subset.

9. The method of claim 6, further comprising monitoring, according to the first monitoring configuration for a physical downlink control channel (PDCCH) candidate.

10. The method of claim 6, wherein the first sub-band subset comprises each of the sub-bands in the plurality of sub-bands, and wherein the second sub-band subset comprises a portion of the sub-bands in the plurality of sub-bands.

11. A wireless transmit/receive unit (WTRU) comprising:
    a processor configured to:
    determine a plurality of sub-bands for a cell;
    monitor, in accordance with a first monitoring configuration, a first search space in a first sub-band subset associated with the plurality of sub-bands wherein the first monitoring configuration comprises an indication of the sub-bands belonging to the first sub-band subset;
    receive downlink control information (DCI) that indicates a channel occupancy time (COT) and a second sub-band subset associated with the plurality of sub-bands, wherein the indicated COT indicates a COT duration; and
    monitor the first search space in the indicated second sub-band subset for a remaining duration of the COT.

* * * * *